US012675184B2

(12) United States Patent
Woo et al.

(10) Patent No.: US 12,675,184 B2
(45) Date of Patent: Jul. 7, 2026

(54) STATIC ELECTRICITY PREVENTION METHOD, AND ELECTRONIC DEVICE THEREFOR

(71) Applicant: SAMSUNG ELECTRONICS CO., LTD., Suwon-si (KR)

(72) Inventors: Kwangtaek Woo, Suwon-si (KR); Seonghun Kim, Suwon-si (KR); Mingyu Kim, Suwon-si (KR); Jaeho Choi, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/200,126

(22) Filed: May 6, 2025

(65) Prior Publication Data

US 2025/0264953 A1     Aug. 21, 2025

Related U.S. Application Data

(63) Continuation of application No. PCT/KR2023/016996, filed on Oct. 30, 2023.

(30) Foreign Application Priority Data

Nov. 15, 2022    (KR) ........................ 10-2022-0152439
Dec. 22, 2022    (KR) ........................ 10-2022-0181491

(51) Int. Cl.
*G06F 3/041*              (2006.01)
(52) U.S. Cl.
CPC .................................. *G06F 3/0416* (2013.01)
(58) Field of Classification Search
CPC ...... G06F 3/0416; G06F 3/0446; G06F 3/041; G06F 3/044; G06F 3/0418
See application file for complete search history.

(56) References Cited

U.S. PATENT DOCUMENTS 9,134,852 B2     9/2015 Zeng
9,544,981 B2     1/2017 Zhang et al.
(Continued)

FOREIGN PATENT DOCUMENTS

CN          102314277 A      1/2012
CN          117093086 A      11/2023
(Continued)

OTHER PUBLICATIONS

Communication dated Jan. 30, 2024, issued by the International Searching Authority in International Application No. PCT/KR2023/016996 (PCT/ISA/210 and PCT/ISA/237).
(Continued)

*Primary Examiner* — Lisa S Landis
(74) *Attorney, Agent, or Firm* — Sughrue Mion, PLLC

(57)               ABSTRACT

Provided is an electronic device including: a display module including a touchscreen panel a touchscreen panel integrated circuit (IC), a display panel, and a display panel IC; memory storing one or more instructions; and at least one processor configured to execute the one or more instructions, wherein the at least one processor is operatively connected to the display module and the memory, and wherein the one or more instructions, when executed by the at least one processor, cause the electronic device to: detect a specified trigger, acquire a sensitivity value of the touchscreen panel, determine whether to enter an antistatic mode based on the acquired sensitivity value, based on determining to enter the antistatic mode, determine a polarity or an intensity of a voltage based on the acquired sensitivity value, and control the display module based on the polarity or the intensity of the voltage.

20 Claims, 13 Drawing Sheets

(56) References Cited

U.S. PATENT DOCUMENTS

| | | | |
|---|---|---|---|
| 10,423,262 B2 * | 9/2019 | Kang | G06F 3/0412 |
| 2004/0185817 A1 | 9/2004 | Park | |
| 2010/0033886 A1 | 2/2010 | Williams et al. | |
| 2013/0106710 A1 | 5/2013 | Ashbrook | |
| 2014/0001966 A1 | 1/2014 | Cho | |
| 2015/0024728 A1 * | 1/2015 | Jang | G06F 3/012 |
| | | | 455/418 |
| 2015/0103267 A1 | 4/2015 | Zhang et al. | |
| 2016/0148922 A1 * | 5/2016 | Kim | G09G 3/3674 |
| | | | 361/56 |
| 2016/0154525 A1 * | 6/2016 | Hotelling | G06F 3/0443 |
| | | | 345/174 |
| 2018/0224987 A1 | 8/2018 | Kang et al. | |

FOREIGN PATENT DOCUMENTS

| | | | |
|---|---|---|---|
| EP | 3040823 A1 | 7/2016 | |
| JP | 2007 179937 A | 7/2007 | |
| JP | 2008 182597 A | 8/2008 | |
| KR | 10 0531850 B1 | 11/2005 | |
| KR | 10 0632119 B1 | 10/2006 | |
| KR | 10 2013 0102725 A | 9/2013 | |
| KR | 10 2016 0062308 A | 6/2016 | |
| KR | 10 2016 0082461 A | 7/2016 | |
| KR | 10 1917853 B1 | 1/2019 | |
| KR | 10 2182160 B1 | 11/2020 | |
| KR | 10 2021 0011679 A | 2/2021 | |
| KR | 10 2288328 B1 | 8/2021 | |
| WO | 2010 019502 A1 | 2/2010 | |
| WO | WO-2018181495 A1 * | 10/2018 | C09J 133/066 |

OTHER PUBLICATIONS

Extended European Search Report issued Dec. 10, 2025 by the European Patent Office for EP Patent Application No. 23891865.0.

* cited by examiner

Figure 3:
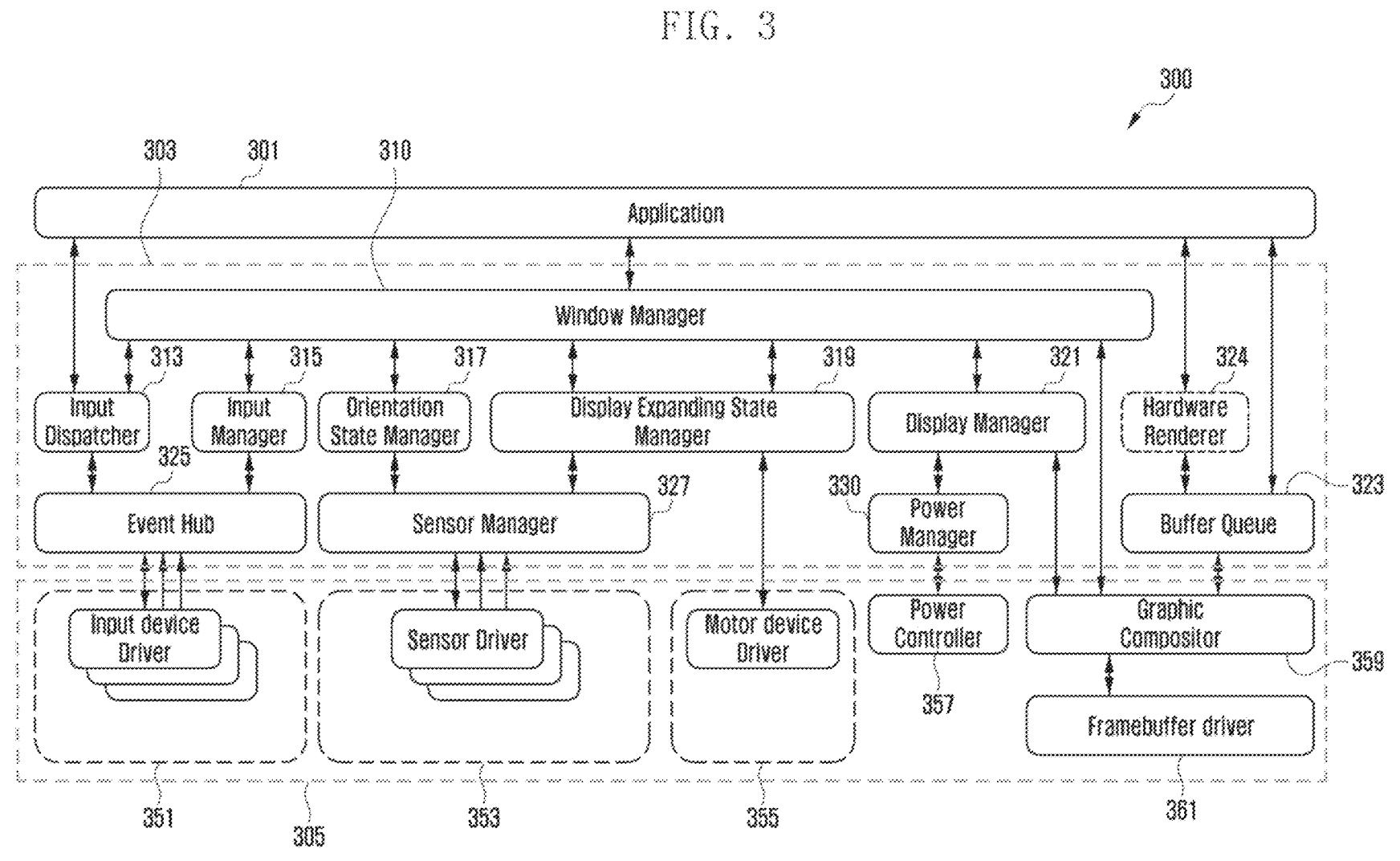

Application

Window Manager

313 — Input Dispatcher

315 — Input Manager

317 — Orientation State Manager

319 — Display Expanding State Manager

321 — Display Manager

323

324 — Hardware Renderer

Buffer Queue

325 — Event Hub

327 — Sensor Manager

330 — Power Manager

Graphic Compositor — 359

Framebuffer driver — 361

Power Controller — 357

Motor device Driver — 355

Sensor Driver — 353

Input device Driver — 351

|  | TX0 | TX1 | TX2 | TX3 |
|---|---|---|---|---|
|  | -10 | -2 | 10 | -5 |
| RX0 | -10 | 18 | -40 | 15 |
| RX1 | -10 | 18 | 10 | 15 |
| RX2 | -10 | -2 | 10 | 25 |
| RX3 | -10 | -2 | 40 | -15 |
| RX4 | 10 | -2 | 10 | -15 |
| RX5 | 10 | -17 | 10 | -15 |
| RX6 | 10 | -17 | 10 | -25 |
| RX7 | 10 | -17 | 10 | -25 |

(850)

|  | TX0 | TX1 | TX2 | TX3 |
|---|---|---|---|---|
| RX0 | 0 | 20 | -50 | 20 |
| RX1 | 0 | 20 | 0 | 20 |
| RX2 | 0 | 0 | 0 | 30 |
| RX3 | 0 | 0 | 30 | -10 |
| RX4 | 20 | 0 | 0 | -10 |
| RX5 | 20 | -15 | 0 | -10 |
| RX6 | 20 | -15 | 0 | -20 |
| RX7 | 20 | -15 | 0 | -20 |

(830)

STATIC ELECTRICITY PREVENTION METHOD, AND ELECTRONIC DEVICE THEREFOR

CROSS-REFERENCE TO RELATED APPLICATIONS

This application is a by-pass continuation of International Application No. PCT/KR2023/016996, filed on Oct. 30, 2023, which is based on and claims priority to Korean Patent Application No. 10-2022-0152439, filed on Nov. 15, 2022 in the Korean Intellectual Property Office, and Korean Patent Application No. 10-2022-0181491, filed on Dec. 22, 2022 in the Korean Intellectual Property Office, the disclosures of which are incorporated by reference herein in their entireties.

BACKGROUND

1. Field

The disclosure relates to a static electricity prevention method and an electronic device therefor.

2. Description of Related Art

With the development of digital technology, various types of electronic devices are widely used, such as mobile phones, personal digital assistants (PDAs), notebooks, smartphones, tablet personal computers (PCs), or wearable devices. Electronic devices can have a limited size for portability, thereby limiting the size of a display. In recent years, various forms of electronic devices have been developed to provide more extended screens on electronic devices through the use of multiple displays.

The display of an electronic device is exposed to the outside and includes a touch sensor for touch detection. The touch sensor detects changes in capacitance caused by an object touching the display. However, static electricity may be generated on the surface of the display due to a residual charge on the display. When static electricity is generated on the surface of the display, dust may easily adhere to the display due to the static electricity.

SUMMARY

Provided is a method and a device for acquiring a sensitivity value of a touchscreen panel when a specified trigger occurs and controlling the polarity and intensity of a voltage applied to a display module, based on the acquired sensitivity value.

According to an aspect of the disclosure, an electronic device includes: a display module including a touchscreen panel a touchscreen panel integrated circuit (IC), a display panel, and a display panel IC; memory storing one or more instructions; and at least one processor configured to execute the one or more instructions, wherein the at least one processor is operatively connected to the display module and the memory, and wherein the one or more instructions, when executed by the at least one processor, cause the electronic device to: detect a specified trigger, acquire a sensitivity value of the touchscreen panel, determine whether to enter an antistatic mode based on the acquired sensitivity value, based on determining to enter the antistatic mode, determine a polarity or an intensity of a voltage based on the acquired sensitivity value, and control the display module based on the polarity or the intensity of the voltage.

According to an aspect of the disclosure, a method of operating an electronic device includes: detecting a specified trigger; acquiring a sensitivity value of a touchscreen panel included in a display module of the electronic device; determining whether to enter an antistatic mode based on the acquired sensitivity value; based on determining to enter the antistatic mode, determining a polarity or an intensity of a voltage, based on the acquired sensitivity value; and controlling the display module based on the polarity or the intensity of the voltage.

According to one or more embodiments, when a specified trigger occurs, a sensitivity value of the touchscreen panel may be acquired, and based on the acquired sensitivity value, the polarity and intensity of a voltage applied to the display module may be controlled to prevent the generation of static electricity.

According to one or more embodiments, based on the sensitivity value of the touchscreen panel, the polarity and intensity of a voltage applied to the touchscreen panel IC may be adjusted such that the sensitivity value converges to zero.

According to one or more embodiments, based on the sensitivity value of the touchscreen panel, the polarity and intensity of a voltage applied to the display IC may be adjusted such that the sensitivity value converges to zero.

According to one or more embodiments, the usability for the user may be improved by performing an antistatic mode in situations where static electricity generation is a concern, such as when locking/unlocking the screen of an electronic device or folding/unfolding a foldable electronic device.

According to one or more embodiments, by correcting the sensitivity value of the touchscreen panel, user discomfort caused by an abnormal sensitivity value may be prevented.

BRIEF DESCRIPTION OF THE DRAWINGS

The above and other aspects and features of certain embodiments of the present disclosure will be more apparent from the following description taken in conjunction with the accompanying drawings, in which:

FIG. 3 is a block diagram illustrating a framework of an electronic device according to one or more embodiments;

FIGS. 8A and 8B illustrate an example of preventing static electricity by using a touchscreen panel IC in an electronic device according to one or more embodiments;

DETAILED DESCRIPTION

Figure 1:
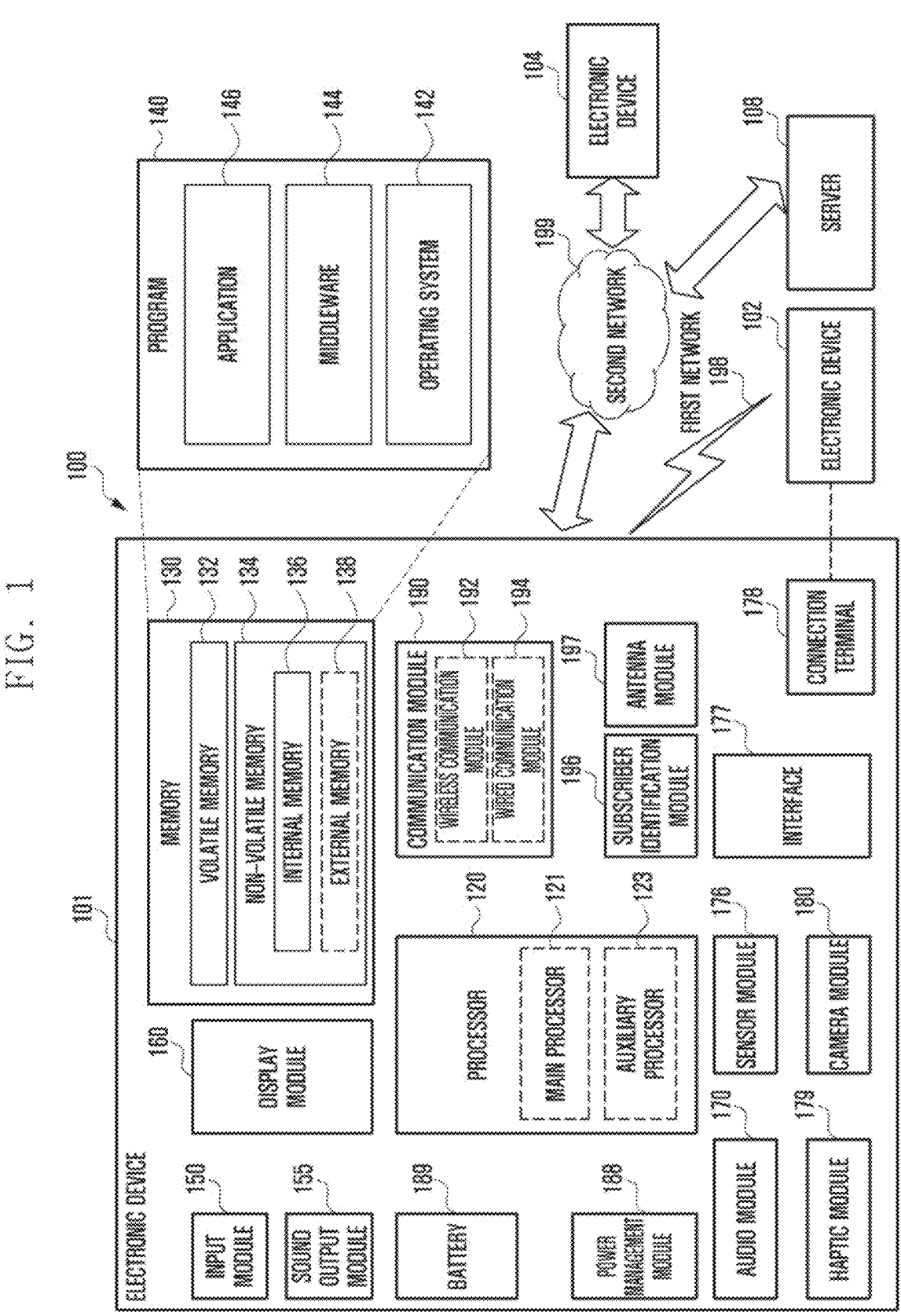
FIG. 1 is a block diagram of an electronic device in a network environment according to one or more embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In one or more embodiments, at least one of the components (e.g., the connecting terminal 178) may be omitted from the electronic device 101, or one or more other components may be added in the electronic device 101. In one or more embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one or more embodiments, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123. According to one or more embodiments, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to one or more embodiments, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to one or more embodiments, the display module 160 may include a touch sensor adapted to detect a touch, or a pressure sensor adapted to measure the intensity of force incurred by the touch.

The audio module 170 may convert a sound into an electrical signal and vice versa. According to one or more embodiments, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one or more embodiments, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one or more embodiments, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., a printed circuit board (PCB)). According to one or more embodiments, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

According to certain embodiments, the antenna module 197 may form a mmWave antenna module. According to one or more embodiments, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to one or more embodiments, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to one or more embodiment disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that one or more embodiment of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to one or more embodiments, the "module" may be implemented in the form of an application-specific integrated circuit (ASIC).

One or more embodiment as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one or more embodiments, a method according to one or more embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiment, each element (e.g., a module or a program) of the above-described elements may include a single entity or multiple entities, and some of the multiple entities mat be separately disposed in any other element. According to one or more embodiment, one or more of the above-described elements may be omitted, or one or more other elements may be added. Alternatively or additionally, a plurality of elements (e.g., modules or programs) may be integrated into a single element. In such a case, according to one or more embodiment, the integrated element may still perform one or more functions of each of the plurality of elements in the same or similar manner as they are performed by a corresponding one of the plurality of elements before the integration. According to one or more embodiment, operations performed by the module, the program, or another element may be carried out sequentially, in parallel, repeatedly, or heuristically, or one or more of the operations may be executed in a different order or omitted, or one or more other operations may be added.

Figure 2A:
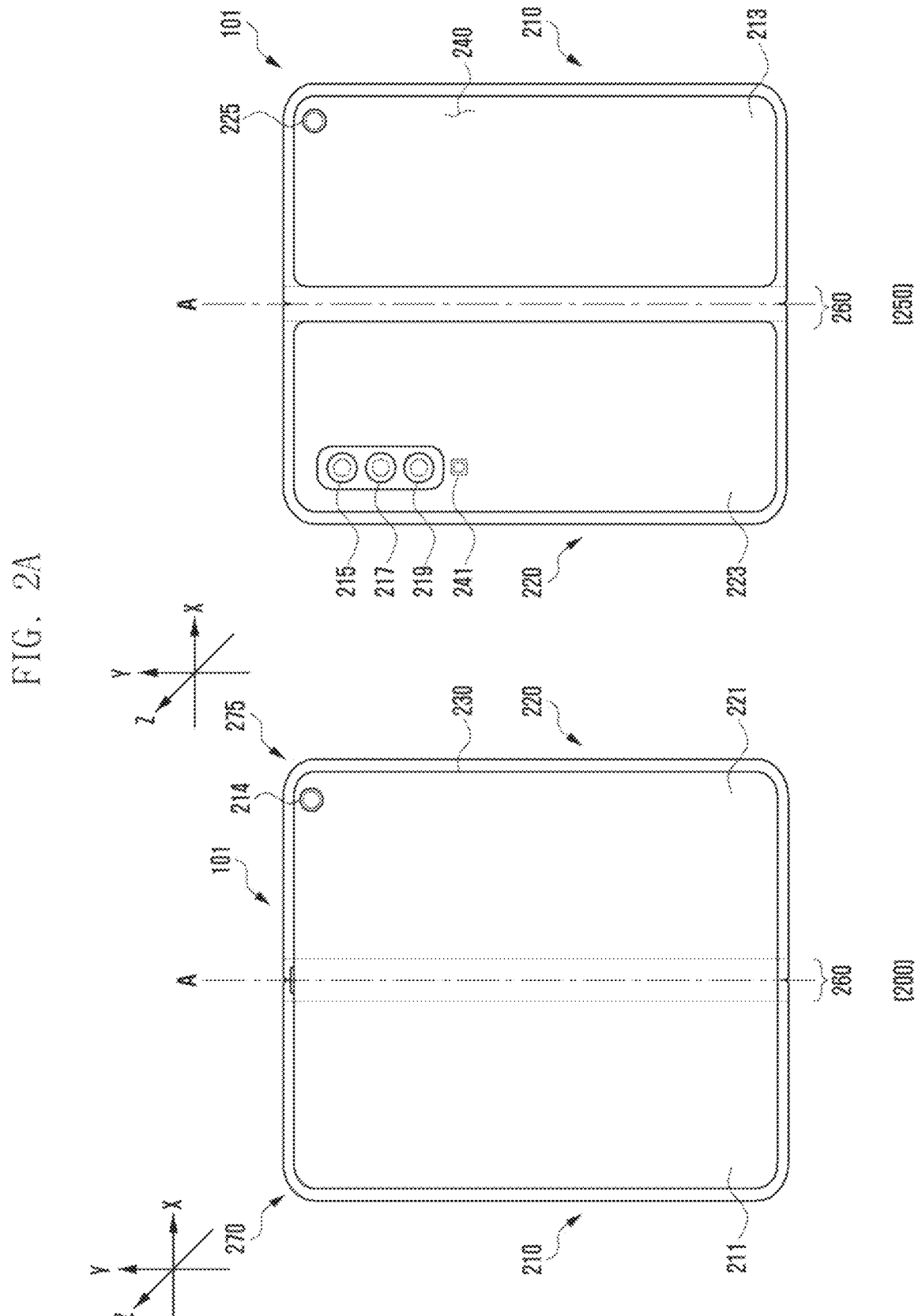
FIG. 2A illustrates an unfolded state of a foldable electronic device according to one or more embodiments.

FIG. 2A illustrates an unfolded state of a foldable electronic device according to one or more embodiments.

Referring to FIG. 2A, a foldable electronic device (e.g., the electronic device 101 in FIG. 1) according to one or more embodiments may include a first housing 210 including a first surface 211 and a third surface 213, and a second housing 220 including a second surface 221 and a fourth surface 223. The first surface 211 of the first housing 210 and the second surface 221 of the second housing 220 may represent a front surface 200 of the foldable electronic device 101, and the third surface 213 of the first housing 210 and the fourth surface 223 of the second housing 220 may represent a rear surface 250 of the foldable electronic device 101.

The first housing 210 and the second housing 220 may be disposed on either side about a folding axis (e.g., the axis A) and may have overall symmetrical shapes with respect to the folding axis. For example, on the front surface 200 of the foldable electronic device 101, the first housing 210 may be on the left side of the foldable electronic device 101 with respect to the folding axis, and the second housing 220 may be on the right side of the foldable electronic device 101. The first housing 210 and the second housing 220 may be designed to be folded with respect to each other. A hinge structure 260 may be disposed between the first housing 210 and the second housing 220, so that the front surface 200 of the foldable electronic device 101 may be folded. In the hinge structure 260, a third sensor module for detecting an angle change between the first housing 210 and the second housing 220 may be disposed. The third sensor module may include at least one of an acceleration sensor, a gyroscope sensor, a geomagnetic sensor, a proximity sensor, a gesture sensor, or a Hall sensor.

The angle or distance between the first housing 210 and the second housing 220 may vary depending on whether the state of the foldable electronic device 101 is an unfolded (or opened) state, a folded (or closed) state, or an intermediate state. For example, the unfolded state (or unfolding state) may refer to an opened state, an open state, or a flat (or planar) state. The unfolded state may refer to a state in which the foldable electronic device 101 is fully unfolded, with the first housing 210 and the second housing 220 disposed side by side. The unfolded state may imply that the angle between the first housing 210 and the second housing 220 is 180 degrees, and the first surface 211 of the first housing 210 and the second surface 221 of the second housing 220 are arranged to face the same direction (e.g., a first direction). FIG. 2A illustrates the front surface 200 of the foldable electronic device 101 and the rear surface 250 of the foldable electronic device 101 while the foldable electronic device 101 is unfolded.

Figure 2B:
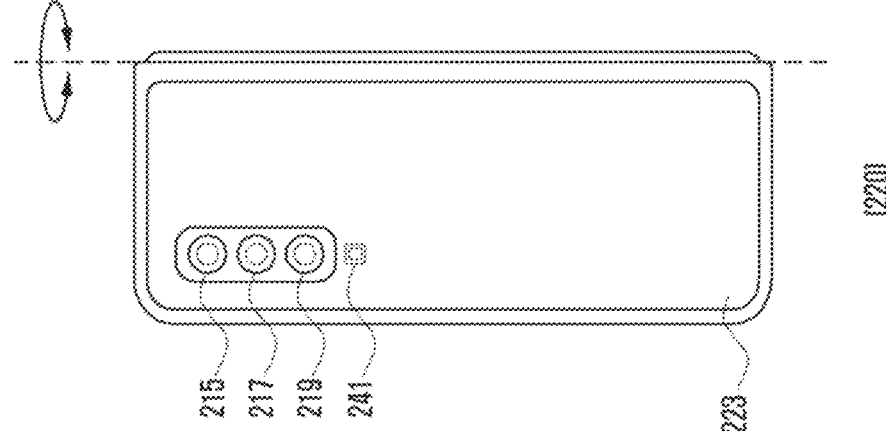
FIG. 2B illustrates a folded state of a foldable electronic device according to one or more embodiments.
Figure 2B:
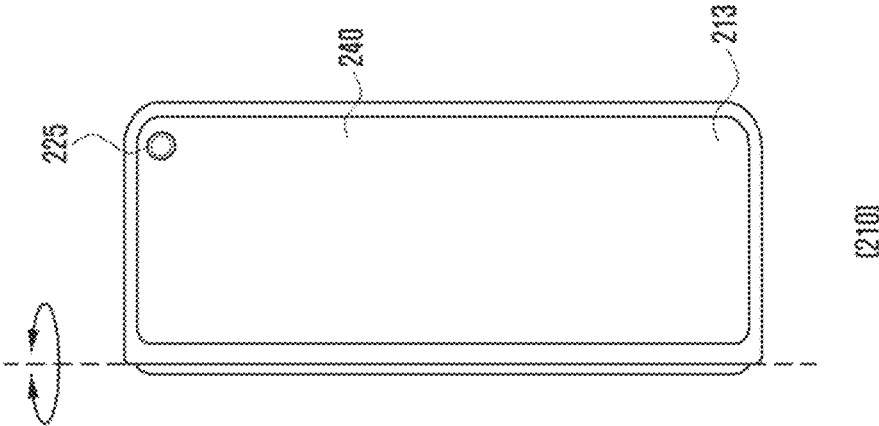

The folded state (folding state) may refer to a folded state, a closed state, or a close state (e.g., FIG. 2B). The folded state may refer to a state in which the foldable electronic device 101 is fully folded, with the first housing 210 and the second housing 220 disposed to face each other. In the folded state, the angle between the first housing 210 and the second housing 220 forms a narrow angle (e.g., 0 to 5 degrees), and the first surface 211 of the first housing 210 and the second surface 221 of the second housing 220 may face each other. Hereinafter, although the foldable electronic device 101 of a folding type implemented as an in-folding type is described, the same or similar description may be applied to the foldable electronic device 101 implemented as an out-folding type.

The intermediate state is a state in which the first housing 210 and the second housing 220 are disposed with a certain angle therebetween, such that the foldable electronic device 101 is neither in the unfolded state nor in the folded state. The intermediate state may refer to a state in which the first surface 211 of the first housing 210 and the second surface 221 of the second housing 220 form a predetermined angle (e.g., 6 to 179 degrees).

The foldable electronic device 101 may have a first display 230 (e.g., a main display) (e.g., the display module 160 in FIG. 1) formed on the first surface 211 and the second surface 221 that are the front surface 200 of the electronic device. The first display 230 may be formed entirely on the front surface 200 (e.g., a first direction of the foldable electronic device 101). The first display 230 may refer to a flexible display having at least a partial area that can be deformed into a flat or curved surface. The first display 230 may be folded to the left and to the right about the folding axis (e.g., the axis A). The first display 230 may include a first display area corresponding to the first surface 211 or a second display area corresponding to the second surface 221. Furthermore, the foldable electronic device 101 may include a first camera 214 disposed on the second surface 221. Although the drawing illustrates one first camera 214, multiple first cameras 214 may be arranged. Although the drawing shows the first camera 214 being disposed on the second surface 221, the first camera 214 may be disposed on the first surface 211.

In addition, the foldable electronic device 101 may have a second display 240 (e.g., a sub-display or a cover display) (e.g., the display module 160 in FIG. 1) disposed on a portion of the rear surface 250 of the electronic device. The second display 240 may be formed on at least a portion of the third surface 213 of the foldable electronic device 101. The foldable electronic device 101 may include multiple cameras (e.g., 215, 217, 219, and 225) on the rear surface 250 of the electronic device 101. For example, the foldable electronic device 101, may include a second camera 215, a third camera 217, a fourth camera 219 disposed on the fourth surface 223, and a fifth camera 225 disposed on the third surface 213. According to one or more embodiment, the second camera 215, third camera 217, fourth camera 219, and fifth camera 225 may have the same or different performance (e.g., field of view or resolution). For example, the second camera 215 may have a field of view greater than 125 degrees (e.g., ultra-wide), the third camera 217 may have a field of view between 90 degrees and 125 degrees (e.g., wide), the fourth camera 219 may have a field of view of 90 degrees and a 2× zoom (e.g., tele), and the fifth camera 225 may have a field of view of 90 degrees and a normal magnification. The foldable electronic device 101 may further include a sensor area 241 on the fourth surface 223. In the sensor area 241, an infrared sensor, a fingerprint sensor, or an illuminance sensor, similar to the sensor module 176 in FIG. 1, may be disposed.

According to one or more embodiment, when the foldable electronic device 101 is in an unfolded state (e.g., FIG. 2A), the first display 230 may be turned on (or activated) and the second display 240 may be turned off (or deactivated). When a user input (e.g., touch or button selection) is not detected for a certain amount of time (e.g., 5 seconds, 10 seconds, or 1 minute) while the first display 230 is turned on, the foldable electronic device 101 may turn off the first display 230. Alternatively, when a user input (e.g., touch or button selection) is detected on the second display 240 while the second display 240 is turned off, the foldable electronic device 101 may turn on the second display 240. According to one or more embodiment, when the second display 240 is turned on, the first display 230 may be turned off. Alternatively, even when the second display 240 is turned on, the foldable electronic device 101 may keep the first display 230 in a turned-on state for a predetermined time, and then turn the first display 230 off when no user input is detected on the first display 230 after a predetermined time has elapsed.

The foldable electronic device 101 may further include a sensor module (e.g., the sensor module 176 in FIG. 1). For example, the foldable electronic device 101 may include a first sensor module in the first housing 210 and a second sensor module in the second housing 220. The first sensor module or the second sensor module may include at least one of an acceleration sensor, a gyroscope sensor, a geomagnetic sensor, a proximity sensor, a gesture sensor, or a Hall sensor. An acceleration sensor is a sensor that detects velocity, and a gyroscope sensor may detect angular velocity, which is the rate of rotation of an object. A geomagnetic sensor is a sensor that detects geomagnetism, and may detect the direction (e.g., azimuth) of the geomagnetism, such as east, west, south, or north, like a compass. A proximity sensor may detect whether an object is nearby, and a gesture sensor may detect infrared light. A Hall sensor may detect changes in electrical signals based on the proximity or distance of a magnetized object. The hall sensor may detect a change in state of the foldable electronic device 101 in an analog or digital manner.

The foldable electronic device 101 may use at least one sensor module (e.g., the first sensor module, the second sensor module, or the third sensor module) to detect a state (e.g., an unfolded state, a folded state, or an intermediate state) of the foldable electronic device 101. Based on when the foldable electronic device 101 is placed as in the front surface 200, the x-axis of the first sensor module or the second sensor module may indicate a left/right direction, the y-axis may indicate a front/back direction, and the z-axis may indicate a height direction. When the foldable electronic device 101 is placed as in the front surface 200, sensing data (or sensing values or sensing angles) of the x-axis, y-axis, and z-axis measured (or acquired) by the first sensor module or the second sensor module may be the same or similar. For example, since the x-axis and y-axis of an inertial sensor are not affected by the direction of gravity, while the z-axis is affected by the direction of gravity, the z-axis sensing data may be different when the foldable electronic device 101 is placed with the front surface 200 and when the foldable electronic device 101 is placed with the rear surface 250.

FIG. 2B illustrates the folded state of a foldable electronic device according to one or more embodiments.

Referring to FIG. 2B, the foldable electronic device 101 may have the hinge structure 260 disposed about a folding axis (e.g., axis A) such that the front surface 200 of the foldable electronic device 101 is in a folded state (e.g., a closed state). FIG. 2B illustrates the third surface 213 of the first housing 210 and the fourth surface 223 of the second housing 220 while the foldable electronic device 101 is folded.

According to one or more embodiment, when the foldable electronic device 101 is in the folded state, the first display 230 may be turned off and the second display 240 may be turned on. When no user input is detected for a predetermined time while the second display 240 is turned on, the foldable electronic device 101 may turn off the second display 240. When the foldable electronic device 101 is in a folded state and the second display 240 is turned off, the foldable electronic device 101 may turn on the second display 240 if a button formed on (or mounted to) the foldable electronic device 101 is selected. Alternatively, when the foldable electronic device 101 is in a folded state, the second display 240 is turned off, and a user input is detected on the second display 240, the foldable electronic device 101 may turn on the second display 240.

According to one or more embodiment, when the foldable electronic device 101 is in a folded state, z-axis sensing data measured (or acquired) by the first sensor module may be different from z-axis sensing data measured (or acquired) the second sensor module. For example, when the third surface 213 of the first housing 210 is placed to face a first direction (e.g., a direction opposite to the direction of gravity) (e.g., when the fourth surface 223 of the second housing 220 is placed to face a second direction (e.g., the direction of gravity)), x-axis and y-axis sensing data measured by the first sensor module may be 0° and z-axis sensing data may be −90°, and x-axis and y-axis sensing data measured by the second sensor module may be 0° and z-axis sensing data may be 90°. The first direction and the second direction may be opposite to each other. Furthermore, when the fourth surface 223 of the second housing 220 is placed to face the first direction (e.g., when the third surface 213 of the first housing 210 is placed to face the second direction), x-axis and y-axis sensing data measured by the first sensor module may be 0° and z-axis sensing data may be 90°, and x-axis and y-axis sensing data measured by the second sensor module may be 0° and z-axis sensing data may be −90°.

FIG. 3 is a block diagram 300 illustrating a framework of an electronic device according to one or more embodiments.

Referring to FIG. 3, a framework according to one or more embodiments is related to a display (e.g., the display module 160 in FIG. 1) and may include, for example, at least one of an application 301, an application framework 303, and a kernel 305.

A window manager 310 may manage one or more graphical user interface (GUI) resources used on a screen. An input dispatcher 313 may distribute and transmit an input event to an event receiving target (e.g., window, or process) module. An input manager 315 may provide input device information provided by the electronic device 101 and may configure display viewport information for interpreting raw data from an input device.

An event hub 325 may be a module that receives events from various devices, such as a touch module and a sensor module, and converts the events to standard input events of the OS. An input device driver 351 may be a device control module for receiving a touch input, a key input, or a mouse input. A sensor driver 353 may be a sensor (e.g., ToF, Illumination, Bending, Hall, Motion) for detecting a display expanding state, and may be an interface module for measuring the direction of a display.

A sensor manager 327 may be a module that converts events from various sensor devices into standardized sensor events suitable for the OS through transformations such as fusing, and controls event flow. A display expanding state manager 319 may analyze one or more sensor events to determine the current expanding state of the display and provide the determined expanding state of the display to each module. A power manager 330 may manage battery capacity, temperature, or power based on a system state, and may use the relevant information to determine or provide relevant information required for operation of the electronic device 101. A power controller 357 may be an interface module for measuring battery information of the electronic device 101.

A display manager 321 may manage the life cycle of a display (e.g., connectivity/property control/removal) and may manage hardware display mapping for outputting a screen GUI element (window). For example, the display manager 321 may change a display to be output by a system event, such as a change in folding state, when the electronic device is a foldable electronic device. A motor device driver 355 may be a motor driver for expanding the display based on a system signal.

A buffer queue 323 may be a memory buffer control module for transmitting graphics bitmap information from an image stream producer (e.g., an application) to a graphic compositor 359. A hardware renderer 324 may be an acceleration module for drawing various graphical elements produced by the application into a buffer for transmitting the graphical elements to the compositor. The graphic compositor 359 may be a module for combining graphic bitmap information of multiple separate sources to output the same into single bitmap information to be output to a display. A frame buffer driver 361 may be a frame buffer control module that contains graphic information to be output to a display.

An electronic device according to one or more embodiments of the disclosure may include a display module 160 including a touchscreen panel 670, a touchscreen panel IC 650, a display panel 930, and a display panel IC 910, a memory 130 configured to store instructions, and a processor 120 operatively connected to the display module and the memory, wherein the instructions, when executed by the processor, cause the electronic device to detect a specified trigger, acquire a sensitivity value of the touchscreen panel, determine whether to enter an antistatic mode based on the acquired sensitivity value, determine the polarity or intensity of a voltage based on the acquired sensitivity value when entering the antistatic mode as a result of the determination, and control the display module based on the determined polarity or intensity of the voltage.

In the antistatic mode, a voltage is applied with an inverted phase, and the instructions may include entering the antistatic mode when the acquired sensitivity value exceeds a predetermined threshold.

The instructions may include: acquiring the polarity or intensity of a charge on the touchscreen panel as the sensitivity value; and controlling the touchscreen panel IC based on the determined polarity or intensity of the voltage such that the touchscreen panel IC applies the determined polarity or intensity of the voltage to the touchscreen panel.

The touchscreen panel may include a normal circuit, a phase inversion circuit, and a switch circuit, and the instructions may include controlling, when the determined polarity of the voltage is negative (−) polarity, the switch circuit such that a voltage applied to the touchscreen panel is output through the phase inversion circuit.

The instructions may include: identifying a minimum value and a maximum value among sensitivity values of each Tx line of the touchscreen panel; calculating an average of the difference between absolute values of the minimum value and the maximum value; and determining, based on the average, the intensity of a voltage to be applied to the touchscreen panel.

The instructions may include determining the polarity of the voltage to be applied to the touchscreen panel, based on the polarity of a maximum value among absolute values of the sensitivity values of each Tx line.

The specified trigger may include at least one of the following situations: locking or unlocking a screen of the electronic device; detecting folding or unfolding if the electronic device is a foldable electronic device; during prolonged content playback; immediately before video playback; immediately before a function call that turns off the display panel IC when the display module is turned off; or when the amount of light acquired by an illumination sensor varies.

The instructions may include controlling the display panel IC based on the determined polarity or intensity of the voltage such that the display panel IC applies the determined polarity or intensity of the voltage to the display panel.

The display panel may include a normal circuit, a phase inversion circuit, and a switch circuit, and the instructions may include controlling, when the determined polarity of the voltage is negative (−) polarity, the switch circuit such that a voltage applied to the display panel is output through the phase inversion circuit.

The instructions may include: identifying a sensitivity value and polarity of Tx and Rx coordinates of the touchscreen panel; determining the intensity of a voltage, which is to be applied to each coordinate of the display panel, to converge to zero; and determining the polarity of the voltage, which is to be applied to each coordinate of the display panel, as polarity opposite to that of the identified sensitivity value.

The instructions may include entering the antistatic mode when the acquired sensitivity value exceeds the predetermined threshold.

The instructions may include entering the antistatic mode with respect to the entire area of the display module, or entering the antistatic mode with respect to a partial area of the display module where the acquired sensitivity value exceeds the predetermined threshold.

Figure 4:
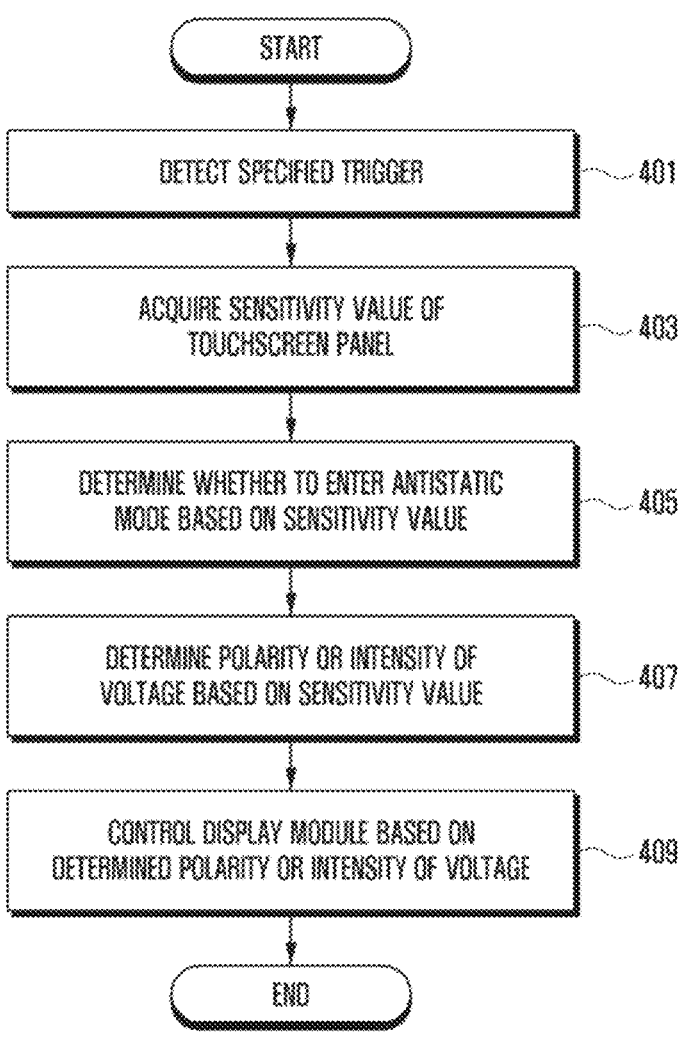
FIG. 4 is a flowchart illustrating a method for operating an electronic device according to one or more embodiments.

FIG. 4 is a flowchart illustrating a method for operating an electronic device according to one or more embodiments.

Referring to FIG. 4, in operation 401, a processor (e.g., the processor 120 in FIG. 1) of an electronic device (e.g., the electronic device 101 in FIG. 1) according to one or more embodiments may detect a specified trigger. Hereinafter, although the operations in FIG. 4 are described as being performed by the processor 120, the operations in FIG. 4 may also be performed by a display driver integrated circuit (DDI). The display driver integrated circuit may be a display and touchscreen driving circuit. The electronic device 101 may be a foldable electronic device as shown in FIGS. 2A and 2B, or may be a bar-type electronic device that is not a foldable electronic device. The bar-type electronic device may not detect folding or unfolding as a designated trigger.

The specified trigger may be determined based on a user's usage status or a detection status of a sensor (e.g., the sensor module 176 in FIG. 1) included in the electronic device 101. The specified trigger may include a manual input by the user.

For example, the manual input by the user may be a trigger to activate an antistatic mode based on the user's need, even without the specified trigger situation. The manual input for activating the antistatic mode may include at least one of a button, a setting menu, or a call, which allows the processor 120 to detect the manual input as a specified trigger. When a manual input for activation of an antistatic mode is detected, the processor 120 may determine that a specified trigger has been detected.

The user usage status may include at least one of the following situations: locking or unlocking a screen of the electronic device 101; detecting folding or unfolding if the electronic device 101 is a foldable electronic device; or during prolonged content playback or immediately before video playback. For example, when locking or folding the screen of the electronic device 101, the user may intend to terminate use of the electronic device 101. Conversely, when unlocking or unfolding the screen of the electronic device 101, the user may intend to use the electronic device 101. The processor 120 may detect a specified trigger in situations such as immediately before, during, or after the user's use of the electronic device 101.

Furthermore, the detection status of the sensor may include at least one of the following situations: immediately before a function call that turns off a display panel IC when a display (e.g., the display module 160 in FIG. 1) is turned off; or when the amount of light acquired by an illuminance sensor (e.g., the sensor module 176 in FIG. 1) varies. The examples of specified trigger are listed solely for the purpose of aiding the understanding of the disclosure, and the disclosure is not limited by these examples. The specified trigger may further include other situations in addition to those described above.

In operation 403, the processor 120 may acquire a sensitivity value of a touchscreen panel. A display (e.g., the display module 160 in FIG. 1) may include at least one of a touchscreen panel, a touchscreen panel integrated circuit (IC), a display panel, or a display panel IC. The touchscreen panel, the touchscreen panel IC, the display panel, or the display panel IC may be implemented in an integrated form. The touchscreen panel may refer to an input device that, when pressed or touched by a finger or a pen, recognizes a position thereof and transmits the position to a system. When a user touches the touchscreen panel, the touchscreen panel may detect an electrical capacity change (an analog signal). The touchscreen panel IC is a chip that controls the touchscreen panel, and may control the touchscreen panel to be driven in response to the position of a touch on the touchscreen panel. The touchscreen panel has a structure where a Tx electrode (transmit) and an Rx electrode (receive) are patterned in a matrix form, and may be classified as glass (GG, G2), film (GFF), GIF, GF2, and/or embedded (on-cell, in-cell) types depending on the position, material, and/or process method of the electrodes.

The sensitivity value of the touchscreen panel is the strength value of the touchscreen panel, and may include the polarity of a charge or the intensity of the charge. The sensitivity value may be raw data or may be converted to a numerical value. The processor 120 may control the touchscreen panel IC to acquire the sensitivity values of the Tx and Rx of the touchscreen panel. The touchscreen panel IC may read the sensitivity value of the touchscreen panel and transmit the read sensitivity value to the processor 120, and the processor 120 may process an antistatic mode. Alternatively, the touchscreen panel IC may read the sensitivity value of the touchscreen panel under control of the processor 120 to process the antistatic mode.

In operation 405, the processor 120 may determine whether to enter the antistatic mode, based on the sensitivity value. The processor 120 may enter the antistatic mode when the sensitivity value exceeds a predetermined threshold. Alternatively, the processor 120 may enter the antistatic mode when the sensitivity value exceeding the predetermined threshold exceeds a predetermined percentage of the entire area of the display module 160. For example, the processor 120 may enter the antistatic mode when the sensitivity value exceeds the predetermined threshold in an area that exceeds 50% of the entire area of the display module 160. The processor 120 may enter the antistatic mode for the entire area of the display module 160. Alternatively, the processor 120 may enter the antistatic mode for only a partial area of the display module 160 where a sensitivity value exceeds the predetermined threshold.

According to one or more embodiments, the processor 120 may acquire a sensitivity value of the entire area of the display module 160 to determine whether to enter the antistatic mode. Alternatively, the processor 120 may acquire a sensitivity value of a partial area of the display module 160 to determine whether to enter the antistatic mode. The partial area of the display module 160 may be an area in which static electricity occurs very frequently, and, for example, may be an area of the electronic device 101 where no antenna is disposed. Among the components (e.g., the processor 120, the camera module 180, and the communication module 190) disposed in the electronic device 101, an antenna generates strong radio waves, and therefore, an area corresponding to the antenna may have many accumulated charges (positive or negative charges). For example, static electricity is often generated when an area is charged with positive charges (or negative charges), so an area corresponding to the antenna, in which negative charge (or positive charges) is generated, may be at a lower risk of generating static electricity. Accordingly, the processor 120 may acquire a sensitivity value of a partial area of the display module 160, other than the area where the antenna is disposed, to determine whether to enter the antistatic mode.

In operation 407, the processor 120 may determine the polarity or intensity of a voltage, based on the acquired sensitivity value. The intensity of a charge (or a voltage) may need to converge to zero in order to prevent static electricity. The processor 120 may determine the polarity or intensity of a voltage such that the intensity of the voltage converges to zero. The processor 120 may control the touchscreen panel IC or the display panel IC according to the antistatic mode. In one or more embodiments, when controlling the touchscreen panel IC, the processor 120 may determine the polarity or intensity of a voltage applied to the Tx line of the touchscreen panel based on the acquired sensitivity value (e.g., intensity of the value) and the polarity (e.g., +,−) of the acquired sensitivity value. The processor 120 may determine the polarity or intensity of the voltage such that a peak value of the obtained sensitivity value is removed, or the sensitivity value converges to an average value. For example, the processor 120 may identify a minimum value and a maximum value among sensitivity values of one Tx line, and averaging the difference between the absolute value of the minimum value and the absolute value of the maximum value, thereby determining the intensity of the voltage. Furthermore, the processor 120 may determine the polarity of a voltage to be applied to the Tx line, based on the polarity of a maximum value among absolute values of the sensitivity values. For example, the processor 120 may determine that when the polarity of a maximum value among sensitivity values on a Tx0 line is positive (+), negative (−) polarity is applied to the Tx line, and may determine that when the polarity of the maximum value among the sensitivity values is negative (−), positive (+) polarity is applied to the Tx line.

Generally, the polarity of a voltage applied to the Tx line of the touchscreen panel is positive (+), and thus a normal circuit and a phase inversion circuit may be formed on the Tx line to change the polarity of the voltage. The processor 120 may control a switch (e.g., turn off the switch) such that a voltage is applied through the normal circuit when positive (+) polarity is applied to the Tx line, and may control the switch (e.g., turn on the switch) such that a voltage is applied through the phase inversion circuit when negative (−) polarity is applied to the Tx line. When the switch is turned off, an electrical path is formed such that a voltage applied to the touchscreen panel is output through the normal circuit, and when the switch is turned on, an electrical path is formed such that a voltage applied to the touchscreen panel is output through the phase inversion circuit as negative (−) polarity voltage. The touchscreen panel may include multiple Tx lines (e.g., also referred to herein as first electrodes). The processor 120 may determine the polarity and intensity of a voltage for each Tx line.

In another embodiment, when controlling the display panel IC, the processor 120 may determine the polarity or intensity of a voltage applied to each coordinate of the display panel, based on the acquired sensitivity value. The coordinates (x, y) of the display panel may correspond to pixels of the display panel. Although the touchscreen panel may adjust the polarity and intensity of a voltage for each Tx line, the display panel may designate the intensity of light for each pixel, thereby allowing precise control of the polarity and the charge amount at a portion corresponding to each coordinate. For example, the processor 120 may determine the polarity and intensity of the voltage to converge to a value of 0 in response to a sensitivity value of one Tx line included in the touchscreen panel.

For example, if values of Rx0 to Rx3 on the Tx0 line are 0, and values of Rx4 to Rx7 are 20, the processor 120 may apply polarity and intensity of voltage of "0" to coordinates (x, y) of the display panel corresponding to Rx0 to Rx3 on the Tx0 line and polarity and intensity of voltage of "−20" to coordinates of the display panel corresponding to Rx4 to Rx7 on the Tx0 line. In order to change the polarity of a voltage applied to each coordinate of the display panel, a normal circuit and a phase inversion circuit may be formed in the display panel. The processor 120 may control a switch (e.g., turn off the switch) such that a voltage is applied through the normal circuit when applying positive (+) polarity to each coordinate of the display panel, and may control the switch (e.g., turn on the switch) such that a voltage is applied through the phase inversion circuit when applying negative (−) polarity to each coordinate of the display panel. When the switch is turned off, an electrical path may be formed such that the voltage applied to the display panel is output through the normal circuit, and when the switch is turned on, an electrical path may be formed such that the voltage applied to the display panel is output through the phase inversion circuit.

The above example is an example to aid in the understanding of the disclosure, and the disclosure is not limited by the example. The processor 120 may use the sensitivity value of the touchscreen panel to determine the polarity or intensity of a voltage to prevent static electricity by various methods (e.g., removing a peak value of the sensitivity value, averaging squared values, or assigning a weight).

In operation 409, the processor 120 may control the display module 160 based on the determined polarity or intensity of the voltage. The processor 120 may control the touchscreen panel IC included in the display module 160, or may control the display panel IC included in the display module 160. For example, when controlling the touchscreen panel IC, the processor 120 may control the touchscreen panel IC such that the determined polarity and intensity of the voltage are applied to each Tx line of the touchscreen panel. When controlling the display panel IC, the processor 120 may control the display panel IC such that the determined polarity and intensity of the voltage are applied to each coordinate of the display panel.

Figure 5:
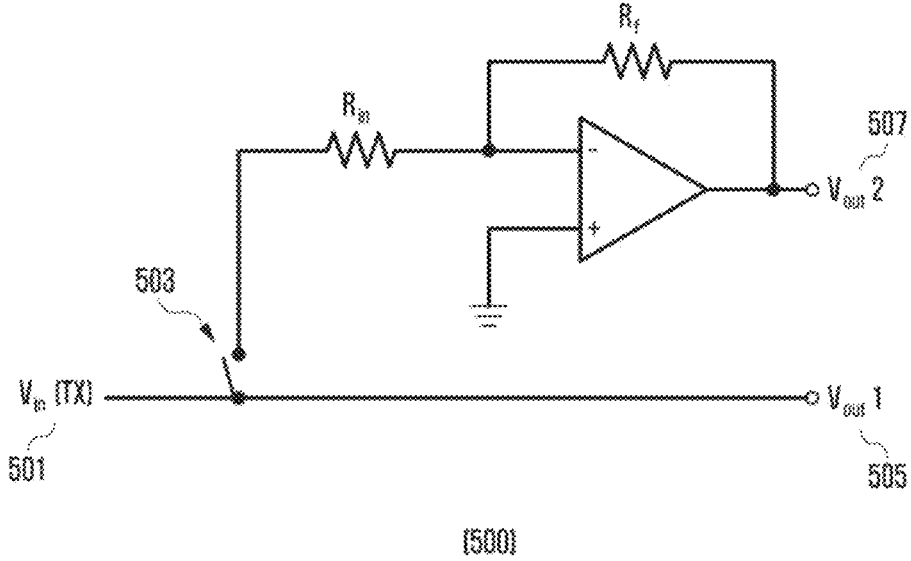
FIG. 5 illustrates a circuit of a touchscreen panel included in an electronic device according to one or more embodiments.

FIG. 5 illustrates a circuit of a touchscreen panel included in an electronic device according to one or more embodiments.

Referring to FIG. 5, an electronic device (e.g., the electronic device 101 in FIG. 1) according to one or more embodiments may have a circuit 500 for a touchscreen panel, where a normal circuit and a phase inversion circuit are formed. $V_{in}$ 501 indicates an input unit (e.g., a Tx line) for applying a voltage to the touchscreen panel, and a switch circuit 503 may be used to control the polarity of the voltage applied to the touchscreen panel. A processor (e.g., the processor 120 in FIG. 1, or the display driver integrated circuit) of the electronic device 101 may control the intensity of the voltage applied to $V_{in}$ 501 and control the switch circuit 503 to control the polarity of a voltage.

When the switch circuit 503 is turned off, an electrical path may be formed such that the voltage applied to the touchscreen panel (e.g., $V_{in}$ 501) may be transmitted to the normal circuit and output (e.g., $V_{out}1$ 505). $V_{out}1$ 505 indicates that a voltage is transmitted to the normal circuit and output. The voltage output from the normal circuit may have positive (+) polarity. When the switch circuit 503 is turned on, an electrical path may be formed such that the voltage applied to the touchscreen panel (e.g., $V_{in}$ 501) may be transmitted to the phase inversion circuit and output (e.g., $V_{out}2$ 507). $V_{out}2$ 507 indicates that a voltage is transmitted to the phase inversion circuit and output. The voltage output from the phase inversion circuit may have negative (−) polarity.

Figure 6:
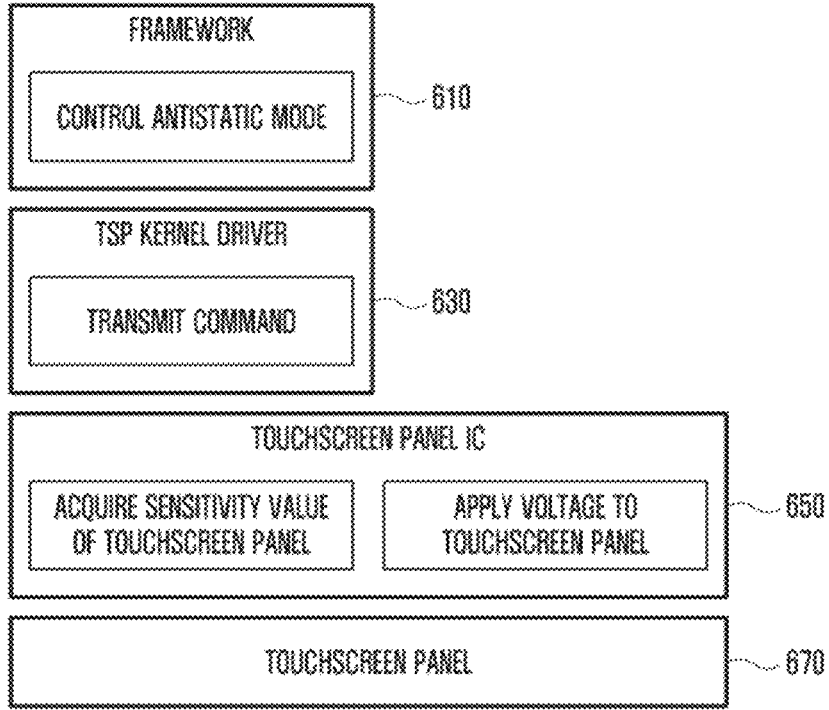
FIG. 6 illustrates a block diagram of components related to static electricity prevention in an electronic device according to one or more embodiments.

FIG. 6 illustrates components related to static electricity prevention in an electronic device according to one or more embodiments.

Referring to FIG. 6, according to one or more embodiments, an electronic device (e.g., the electronic device 101 in FIG. 1) may include at least one of a framework 610, a TSP kernel driver 630, a touchscreen panel IC 650, and a touchscreen panel 670. The framework 610 may detect whether a specified trigger is detected, thereby initiating an antistatic mode. The specified trigger may be determined based on a user's usage status or a detection status of a sensor (e.g., the sensor module 176 in FIG. 1) included in the electronic device 101. The user's usage status may include at least one of the following situations: locking or unlocking a screen of the electronic device 101 (e.g., a bar-type electronic device and a foldable electronic device); detecting folding or unfolding if the electronic device 101 is a foldable electronic device (e.g., only for the foldable electronic device); or during prolonged content playback or immediately before video playback (e.g., a bar-type electronic device and a foldable electronic device). For example, when locking or folding the screen of the electronic device 101, the user may intend to terminate the use of the electronic device 101. Conversely, when unlocking or unfolding the screen of the electronic device 101, the user may intend to use the electronic device 101. The processor 120 may detect a specified trigger in situations such as immediately before, during, or after the user's use of the electronic device 101.

Furthermore, the detection status of the sensor may include at least one of the following situations: immediately before a function call that turns off a display panel IC when a display (e.g., the display module 160 in FIG. 1) is turned off; or when the amount of light acquired by an illuminance sensor varies. The examples of specified trigger are listed solely for the purpose of aiding the understanding of the disclosure, and the disclosure is not limited by these examples. The specified trigger may further include manual driving or other situations in addition to those described above. The framework 610 may transmit, to the TSP kernel driver 630, an event indicating that the antistatic mode has been started.

The TSP kernel driver 630 may receive, from the framework 610, the event indicating that the antistatic mode has been started. When the event is received, the TSP kernel driver 630 may transmit, to the touchscreen panel IC 650, an instruction to collect (or acquire) a sensitivity value of the touchscreen panel 670.

The touchscreen panel IC 650 may read the sensitivity value of the touchscreen panel 670 in response to the command from the TSP kernel driver 630. The sensitivity value may include the polarity or intensity of a charge. The sensitivity value may be raw data or may be converted to a numerical value (e.g., a strength value). The touchscreen panel IC 650 may determine the polarity and intensity of a voltage to be applied to the touchscreen panel 670, based on the collected sensitivity value. The touchscreen panel IC 650 may identify a minimum value and a maximum value among sensitivity values of one Tx line, and determine the intensity of a voltage by calculating an average of a difference between an absolute value of the minimum value and an absolute value of the maximum value. The touchscreen panel IC 650 may determine the polarity of a voltage to be applied to the Tx line according to the polarity of the maximum value among the sensitivity values. For example, the touchscreen panel IC 650 may determine that when the polarity of a maximum value among the sensitivity values on a Tx0 line is positive (+), negative (−) polarity is applied to the Tx0 line, and may determine that when the polarity of the maximum value among the sensitivity values is negative (−), positive (+) polarity is applied to the Tx0 line.

The polarity of a voltage applied to the Tx line of the touchscreen panel IC 650 is positive (+). Therefore, in order to change the polarity of the voltage, the touchscreen panel 670 may further include a phase-inversion circuit. The touchscreen panel IC 650 may control a switch of the touchscreen panel 670 (e.g., turn off the switch) such that a voltage is applied through a normal circuit when positive (+) polarity is applied to the Tx line, and may control the switch of the touchscreen panel 670 (e.g., turn on the switch) so that a voltage is applied through a phase-inversion circuit when negative (−) polarity is applied to the Tx line. Since the touchscreen panel IC 650 includes multiple Tx lines, the touchscreen panel IC 650 may determine the polarity and intensity of a voltage for each Tx line. The touchscreen panel IC 650 may apply the polarity and intensity of the voltage determined for each Tx line to the touchscreen panel 670.

When a charge on the touchscreen panel 670 is stabilized by the applied polarity and intensity of the voltage, the touchscreen panel IC 650 may transmit a completion message to the TSP kernel driver 630. The TSP kernel driver 630 may receive the completion message from the touchscreen panel IC 650. The TSP kernel driver 630 may notify the framework 610 that the completion message has been received. The framework 610 may terminate the antistatic mode when receiving the completion message.

Figure 7:
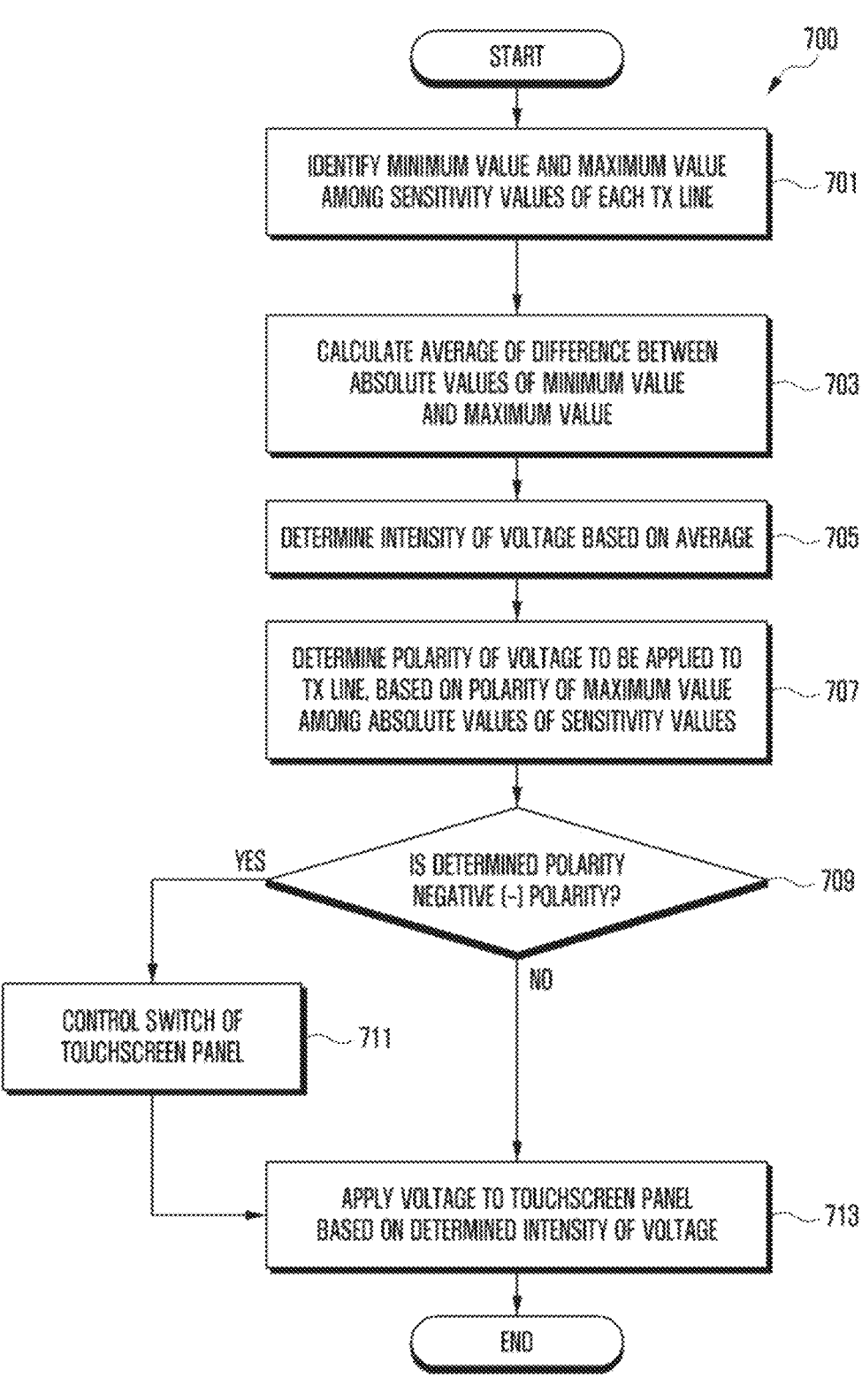
FIG. 7 is a flowchart illustrating a method for preventing static electricity by using a touchscreen panel IC in an electronic device according to one or more embodiments.

FIG. 7 is a flowchart 700 illustrating a method for preventing static electricity by using a touchscreen panel IC in an electronic device according to one or more embodiments. FIG. 7 may include operations that embody operations 407 and 409 in FIG. 4.

Referring to FIG. 7, in operation 701, a processor (e.g., the processor 120 in FIG. 1) of an electronic device (e.g., the electronic device 101 in FIG. 1) according to one or more embodiments may identify a minimum value and a maximum value among sensitivity values of each Tx line of a touchscreen panel (e.g., the touchscreen panel 670 in FIG. 6). Although the operations in FIG. 7 have been described as being performed by the processor 120, a display driver integrated circuit (DDI) or a touchscreen panel IC (e.g., the touchscreen panel IC 650 in FIG. 6) may also perform the operations in FIG. 7. A display (e.g., the display module 160 in FIG. 1) included in the electronic device may include at least one of the touchscreen panel 670, the touchscreen panel IC 650, a display panel, or a display panel IC. The touchscreen panel 670 has a structure in which a Tx electrode and an Rx electrode are patterned in a matrix form, and the touchscreen panel IC 650 may control the touchscreen panel 670. The touchscreen panel 670 may control the polarity and intensity of a voltage through a Tx line.

For example, if the touchscreen panel 670 is configured with Tx0 to Tx7, the processor 120 may collect (or acquire) sensitivity values of Rx0 to Rx7 of a Tx0 line, sensitivity values of Rx0 to Rx7 of a Tx1 line, sensitivity values of Rx0 to Rx7 of a Tx2 line, and sensitivity values of Rx0 to Rx7 of a Tx3 line, sensitivity values of Rx0 to Rx7 of a Tx4 line, sensitivity values of Rx0 to Rx7 of a Tx5 line, sensitivity values of Rx0 to Rx7 of a Tx6 line, and sensitivity values of Rx0 to Rx7 of a Tx7 line. The processor 120 may identify a minimum value and a maximum value among the sensitivity values of Rx0 to Rx7 of the Tx0 line, may identify a minimum value and a maximum value among the sensitivity values of Rx0 to Rx7 of the Tx1 line, may identify a minimum value and a maximum value among the sensitivity values of Rx0 to Rx7 of the Tx2 line, may identify a minimum value and a maximum value among the sensitivity values of Rx0 to Rx7 of the Tx3 line, may identify a minimum value and a maximum value among the sensitivity values of Rx0 to Rx7 of the Tx4 line, may identify a minimum value and a maximum value among the sensitivity values of Rx0 to Rx7 of the Tx5 line, may identify a minimum value and a maximum value among the sensitivity values of Rx0 to Rx7 of the Tx6 line, and may identify a minimum value and a maximum value among the sensitivity values of Rx0 to Rx7 of the Tx7 line.

In operation 703, the processor 120 may calculate the average of the difference between absolute values of the minimum value and the maximum value. For example, when, on the Tx0 line, the minimum value is 0 and the maximum value is 20, the difference between the absolute value (e.g., 0) of the minimum value and the absolute value (e.g., 20) of the maximum value is 20, which may be divided by 2 to calculate an average (e.g., 10). When, on the Tx1 line, the minimum value is −15 and the maximum value is 20, the difference between the absolute value (e.g., 15) of the minimum value and the absolute value (e.g., 20) of the maximum value is 5, which may be divided by 2 to calculate an average (e.g., 2.5). When, on the Tx2 line, the minimum value is −50 and the maximum value is 30, the difference between the absolute value (e.g., 50) of the minimum value and the absolute value (e.g., 30) of the maximum value is 20, which may be divided by 2 to calculate an average (e.g., 10).

In operation 705, the processor 120 may determine the intensity of a voltage based on the average. The processor 120 may determine the intensity of the voltage as the average of each Tx line. For example, if the average of the Tx0 line is 10, the processor 120 may determine the voltage intensity to be 10; when the average of the Tx1 line is 2.5, the voltage intensity may be determined to be 2; and when the average of the Tx2 line is 10, the voltage intensity may be determined to be 10.

In operation 707, the processor 120 may determine the polarity of a voltage to be applied to a Tx line based on the polarity of a maximum value among the absolute values of sensitivity values. For example, when the polarity of a maximum value among absolute values of the sensitivity values of the Tx0 line is positive (+), the processor 120 determines the polarity of a voltage to be applied to the Tx0 line to be negative (−); when the polarity of a maximum value among absolute values of the sensitivity values of the Tx1 line is positive (+), the polarity of a voltage to be applied to the Tx1 line is determined to be negative (−); and when the polarity of a maximum value among absolute values of the sensitivity values of the Tx2 line is negative (−), the polarity of a voltage to be applied to the Tx2 line is determined to be positive (+).

In operation 709, the processor 120 may determine whether the determined polarity is negative (−) polarity. The processor 120 may perform operation 711 when the determined polarity is negative (−) polarity, and perform operation 713 when the determined polarity is not negative (−) polarity (e.g., when the determined polarity is positive (+) polarity).

When the determined polarity is negative (−) polarity, in operation 711, the processor 120 may control a switch of the touchscreen panel 670. Taking FIG. 5 as an example, the processor 120 may turn on the switch circuit 503 of the touchscreen panel 670 to invert the polarity of a voltage that is input to the touchscreen panel 670.

When the determined polarity is not negative (−) polarity (i.e., when the determined polarity is positive (+) polarity), in operation 713, the processor 120 may apply a voltage to the touchscreen panel 670 based on the determined intensity of the voltage. The processor 120 may control the touchscreen panel IC 650 to apply a voltage to the touchscreen panel 670 based on the determined intensity of the voltage. When the switch circuit 503 of the touchscreen panel 670 is turned off, the voltage input to the touchscreen panel 670 may be applied with positive (+) polarity through a normal circuit. When the switch circuit 503 of the touchscreen panel 670 is turned on, the voltage input to the touchscreen panel 670 may be applied with negative (−) polarity through a phase inversion circuit.

Figure 8A:
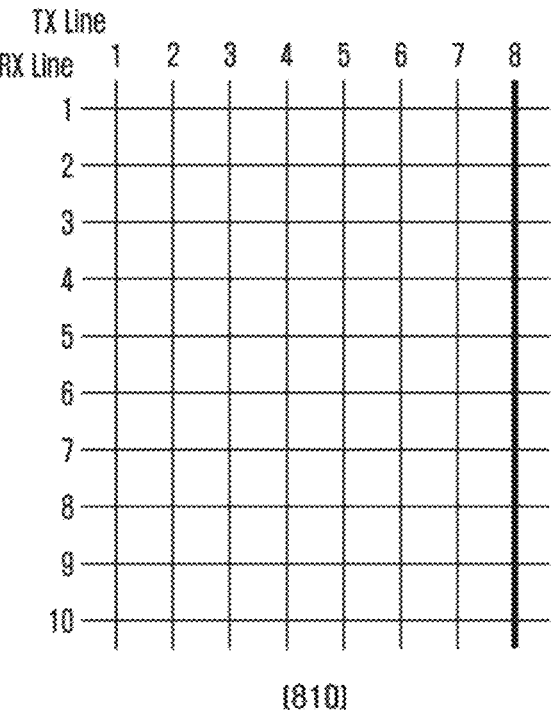

FIGS. 8A and 8B illustrate an example of preventing static electricity by using a touchscreen panel IC in an electronic device according to one or more embodiments.

Referring to FIG. 8A, a touchscreen panel (e.g., the touchscreen panel 670 in FIG. 6) according to one or more embodiments may be formed with Tx and Rx electrodes patterned in a matrix form (also referred to herein as first electrodes and second electrodes, respectively). In the touchscreen panel 670, a voltage may be applied to a Tx line (e.g., a vertical line) on which the Tx electrode is formed. Therefore, in the touchscreen panel 670, a voltage may be applied to each x-axis coordinate, which is a Tx line, rather than being applied to each coordinate having x-axis coordinate (e.g., a Tx line) and a y-axis coordinate (e.g., an Rx line). For example, when a voltage is applied to the touchscreen panel 670, one voltage polarity and voltage intensity may be applied to each Tx line, such as +10 applied to a Tx0 line and −5 applied to a Tx1 line.

However, the application method for the touchscreen panel may sufficiently correct the charge difference in vertical units, but if the strength of each horizontal coordinate (e.g., Rx line) is different, there may be limitations in performing a flattening operation that converges the charge to zero.

FIG. 8B may illustrate an example in which the polarity and intensity of voltage have been applied to the touchscreen panel 670.

Referring to FIG. 8B, first sensitivity values 830 of the touchscreen panel 670 acquired after a specified trigger is detected and second sensitivity values 850 of the touchscreen panel 670 after performing an antistatic mode are shown. The first sensitivity values indicate first sensitivity values of Rx0 to Rx7 corresponding to Tx0 to Tx3. For example, on a Tx0 line, first sensitivity values of Rx0 to Rx3 may be 0, and first sensitivity values of Rx4 to Rx7 may be 20. Furthermore, on a Tx1 line, first sensitivity values of Rx0 to Rx1 may be 20, first sensitivity values of Rx2 to Rx4 may be 0, and first sensitivity values of Rx5 to Rx7 may be −15.

The processor 120 (or the touchscreen panel IC 650) may calculate an average of the absolute value difference between a maximum value of 20 and a minimum value of 0 on the Tx0 line as "10", and since the polarity of the maximum value is positive (+), the processor 120 may determine that the polarity of a voltage to be applied to the touchscreen panel 670 by an antistatic mode is negative (−) and the voltage intensity is 10. The processor 120 may calculate an average of the absolute value difference between a maximum value of 20 and a minimum value of −15 on the Tx1 line as "2.5", and since the polarity of the maximum value is positive (+), the processor 120 may determine that the polarity of a voltage to be applied to the touchscreen panel 670 by the antistatic mode is negative (−) and the voltage intensity is 2.

The processor 120 may acquire the second sensitivity values 850 by applying the polarity and intensity of a voltage for each Tx line to the touchscreen panel 670, as shown in reference numeral 801. For example, when the processor 120 applies −10 to the Tx0 line of the touchscreen panel 670, second sensitivity values of Rx0 to Rx3 may be −10, and second sensitivity values of Rx4 to Rx7 may be 10. In addition, when the processor 120 applies −2 to the Tx1 line of the touchscreen panel 670, second sensitivity values of Rx0 to Rx1 may be 18, the second sensitivity value of Rx2 to Rx4 may be −2, and second sensitivity values of Rx5 to Rx7 may be −17. When the processor 120 applies 10 to the Tx2 line of the touchscreen panel 670, second sensitivity values of Rx0 may be −40, second sensitivity values of Rx1 to Rx2 may be 10, second sensitivity values of Rx3 may be 40, and second sensitivity values of Rx4 to Rx7 may be 10. When the processor 120 applies −5 to the Tx3 line of the touchscreen panel 670, the second sensitivity values of Rx0 to Rx1 may be 15, second sensitivity values of Rx2 may be 25, second sensitivity values of Rx3 to Rx5 may be −15, and second sensitivity values of Rx6 to Rx7 may be −25.

Static electricity prevention may involve removing the peak value of a sensitivity value, lowering the sensitivity value to an average, reducing the intensity of positive charge, or converging the intensity of positive charge to zero. From this perspective, comparing the first sensitivity values 830 and the second sensitivity values 850 shows that the area where a high positive charge is emitted has been reduced.

Figure 9:
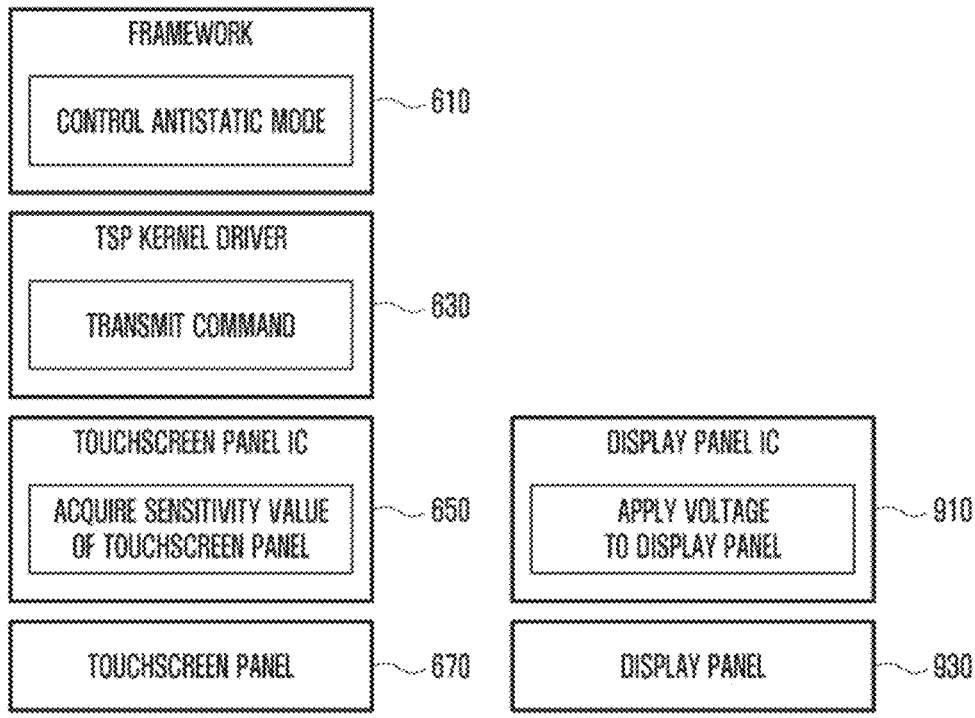
FIG. 9 illustrates a block diagram of components related to preventing static electricity in an electronic device according to one or more embodiments.

FIG. 9 illustrates components related to preventing static electricity in an electronic device according to one or more embodiments.

Referring to FIG. 9, according to one or more embodiments, an electronic device (e.g., the electronic device 101 in FIG. 1) may include at least one of a framework 610, a TSP kernel driver 630, a touchscreen panel IC 650, a touchscreen panel 670, a display panel IC 910, and a display panel 930. The framework 610 may detect whether a specified trigger is detected, thereby starting an antistatic mode. The specified trigger may be determined based on a user's usage status or a detection status of a sensor (e.g., the sensor module 176 in FIG. 1) included in the electronic device 101. The processor 120 may detect a specified trigger in situations such as immediately before, during, and/or after the user's use of the electronic device 101. The framework 610 may instruct the TSP kernel driver 630 to collect (or acquire) sensitivity values of the touchscreen panel 670.

The TSP kernel driver 630 may transmit, to the touchscreen panel IC 650, an instruction to collect (or acquire) the sensitivity values of the touchscreen panel 670 according to a command of the framework 610. The TSP kernel driver 630 may receive the sensitivity values of the touchscreen panel 670 from the touchscreen panel IC 650 according to the command. The TSP kernel driver 630 may transmit the received sensitivity values of the touchscreen panel 670 to the framework 610.

The touchscreen panel IC 650 may read the sensitivity values (e.g., the sensitivity values of the Tx and Rx coordinates) of the touchscreen panel 670 according to a command of the TSP kernel driver 630. The sensitivity values may include the polarity or intensity of a charge. The sensitivity values may be raw data or may be converted to numerical values (e.g., strength values). The touchscreen panel IC 650 may transmit the sensitivity values of the touchscreen panel 670 to the TSP kernel driver 630.

The framework 610 may determine, based on the collected sensitivity value, the polarity and intensity of a voltage to be applied to each coordinate of the display panel 930. The coordinates (x, y) of the display panel 930 may correspond to pixels of the display panel 930. The touchscreen panel 670 may adjust the polarity and intensity of the voltage for each Tx line, but in the case of the display panel 930, the intensity of light may be designated for each pixel, so the polarity and charge amount may be precisely controlled at a portion corresponding to each coordinate. For example, the framework 610 may determine the polarity and intensity of the voltage to be applied to each coordinate of the display panel 930 so that the collected sensitivity values converge to zero.

For example, if the collected sensitivity values are 0 for Rx0 to Rx3 and 20 for Rx4 to Rx7 on a Tx0 line, the framework 610 may control the display panel IC 910 to apply "0" to the polarity and intensity of a voltage at the coordinates (x, y) of the display panel 930 corresponding to Rx0 to Rx3 of the Tx0 line, and apply "−20" to the polarity and intensity of a voltage at the coordinates of the display panel 930 corresponding to Rx4 to Rx7 of the Tx0 line.

The display panel IC 910 may apply the determined polarity and intensity of voltage to each coordinate of the display panel 930 under the control of the framework 610. Furthermore, in order to change the polarity of the voltage applied to each coordinate of the display panel 930, a normal circuit and a phase inversion circuit may be formed in the display panel 930. A switch circuit of the display panel 930 may be formed similarly to a switch circuit of the touchscreen panel 670. The display panel IC 910 may control a switch (e.g., turn off the switch) so that a voltage is applied through the normal circuit when applying positive (+) polarity to the display panel 930 under the control of the framework 610, and may control the switch (e.g., turn on the switch) so that a voltage is applied through the phase inversion circuit when applying negative (−) polarity to the display panel 930.

The display panel IC 910 may transmit a completion message to the framework 610 when a charge in the display panel 930 is stabilized by the polarity and intensity of the applied voltage. The framework 610 may terminate the antistatic mode when the completion message is received.

Figure 10:
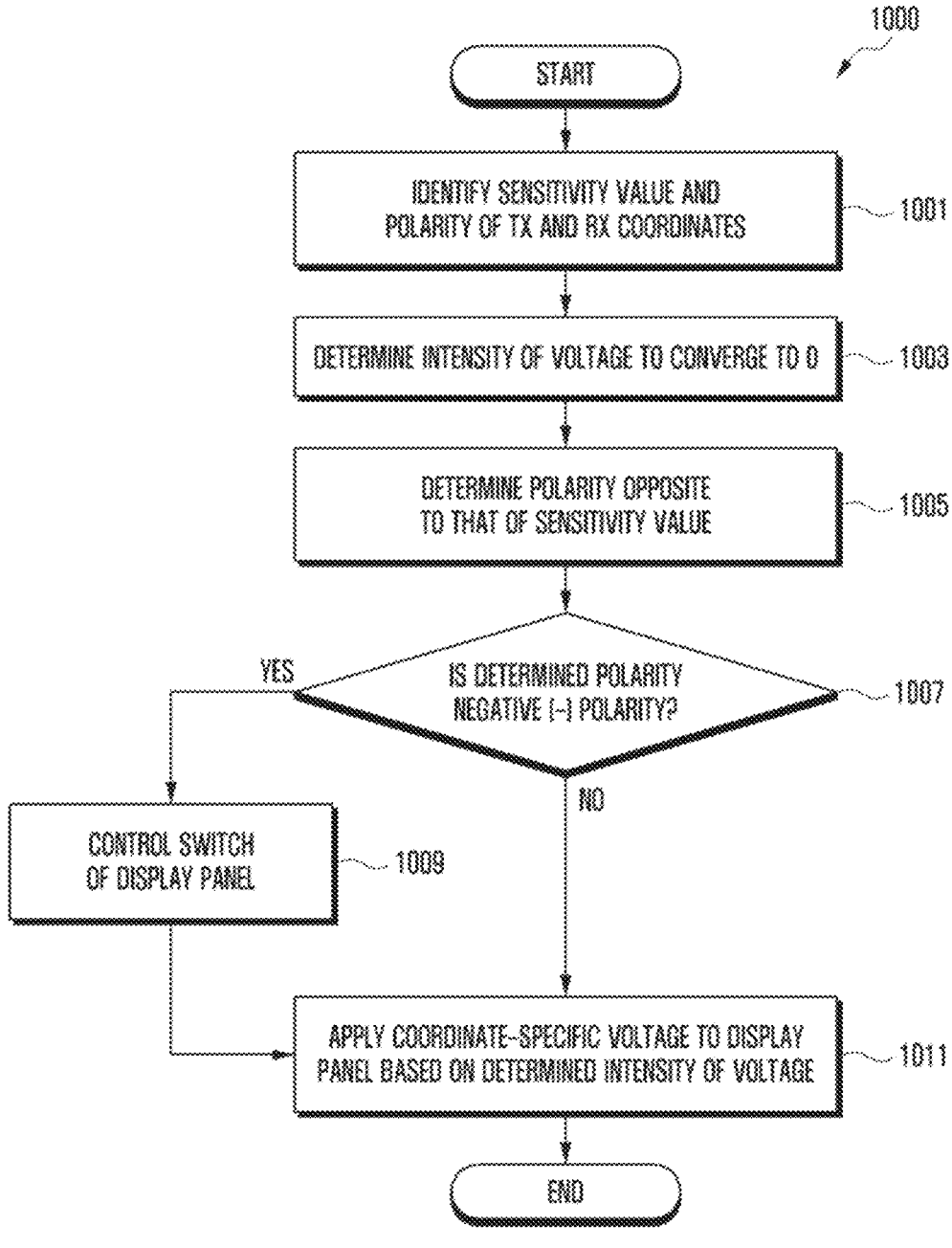
FIG. 10 is a flowchart illustrating a method for preventing static electricity by using a display panel IC in an electronic device according to one or more embodiments.

FIG. 10 is a flowchart 1000 illustrating a method for preventing static electricity by using a display panel IC in an electronic device according to one or more embodiments. FIG. 10 may include operations that embody the operations 407 and 409 in FIG. 4.

Referring to FIG. 10, in operation 1001, a processor (e.g., the processor 120 in FIG. 1) of an electronic device (e.g., the electronic device 101 in FIG. 1) according to one or more embodiments may check (or identify) the sensitivity value and polarity of Tx and Rx coordinates of a touchscreen panel (e.g., the touchscreen panel 670 in FIG. 6). Although the operations in FIG. 10 are described as being performed by the processor 120, a display driver integrated circuit (DDI) may also perform the operations in FIG. 10. A display (e.g., the display module 160 in FIG. 1) included in the electronic device may include at least one of a touchscreen panel (e.g., the touchscreen panel 670 in FIG. 6), a touchscreen panel IC (e.g., the touchscreen panel IC 650 in FIG. 6), a display panel (e.g., the display panel 930 in FIG. 9), or a display panel IC (e.g., the display panel IC 910 in FIG. 6). The touchscreen panel 670 has a structure in which a Tx electrode and an Rx electrode are patterned in a matrix form, and the touchscreen panel IC 650 may control the touchscreen panel. The touchscreen panel 670 may control the polarity and intensity of voltage via a Tx line. The display panel 930 may control the brightness of a screen for each coordinate corresponding to a pixel, and the display panel IC 910 may control the display panel 930. The display panel 930 may control the polarity and intensity of voltage for each of coordinates (e.g., x, y) corresponding to Tx and Rx coordinates of the touchscreen panel 670.

In operation 1003, the processor 120 may determine the intensity of the voltage to converge to zero. The processor 120 may determine the intensity of the voltage for each coordinate, such as (Tx0, Rx0), (Tx0, Rx1), or (Tx0, Rx2). For example, referring to FIG. 8, when sensitivity values identified on the Tx0 line (e.g., the sensitivity values of the Tx and Rx coordinates) are 0 for Rx0 to Rx3 and 20 for Rx4 to Rx7, the processor 120 may determine the intensity of voltage such that on the Tx0 line, a voltage of 0 is applied to Rx0 to Rx3 and a voltage of −20 is applied to Rx4 to Rx7. Also, when sensitivity values identified on the Tx1 line are 20 for Rx0 to Rx1, 0 for Rx2 to Rx4, and −15 for Rx5 to Rx7, the processor 120 may determine the polarity and intensity of voltage such that on the Tx1 line, a voltage of −20 is applied to Rx0 to Rx1, a voltage of 0 is applied to Rx2 to Rx4, and a voltage of 15 is applied to Rx5 to Rx7.

In operation 1005, the processor 120 may determine polarity opposite to that of a sensitivity value. For example, when sensitivity value of the Tx and Rx coordinates identified in operation 1001 has positive (+) polarity, the processor 120 determines that negative (−) polarity is applied to the coordinates of the display panel 930 corresponding to the Tx and Rx coordinates, and that when the sensitivity value of the Tx and Rx coordinates identified in operation 1001 has negative (–) polarity, positive (+) polarity is applied to the coordinates of the display panel 930 corresponding to the Tx and Rx coordinates. In other words, the processor 120 may apply the polarity opposite to that of the sensitivity value, thereby making the voltage intensity converge to zero.

In operation 1007, the processor 120 may determine whether the determined polarity is negative (–) polarity. The processor 120 may perform operation 1009 when the determined polarity is negative (–) polarity, and perform operation 1011 when the determined polarity is not negative (–) polarity (e.g., when the determined polarity is positive (+) polarity).

When the determined polarity is negative (–) polarity, in operation 1009, the processor 120 may control a switch of the display panel 930. Taking FIG. 5 as an example, the switch circuit of the display panel 930 may be formed similarly to the switch circuit of the touchscreen panel 670. The processor 120 may turn on the switch circuit of the display panel 930 to invert the polarity of a voltage that is input to the display panel 930.

When the determined polarity is not negative (–) polarity (i.e., when the determined polarity is positive (+) polarity), in operation 1011, the processor 120 may apply a coordinate-specific voltage to the display panel 930 based on the determined voltage intensity. The processor 120 may control the display panel IC 910 to apply a voltage to each coordinate of the display panel 930 based on the determined voltage intensity. When the switch circuit of the display panel 930 is turned off, the voltage that is input to the display panel 930 may be applied with positive (+) polarity through the normal circuit. When the switch circuit of the display panel 930 is turned on, the voltage that is input to the display panel 930 may be applied with negative (–) polarity through the phaser inversion circuit.

Figure 11:
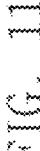
FIG. 11 is a graph illustrating the polarity and intensity of a voltage in an electronic device according to one or more embodiments.
Figure 11:
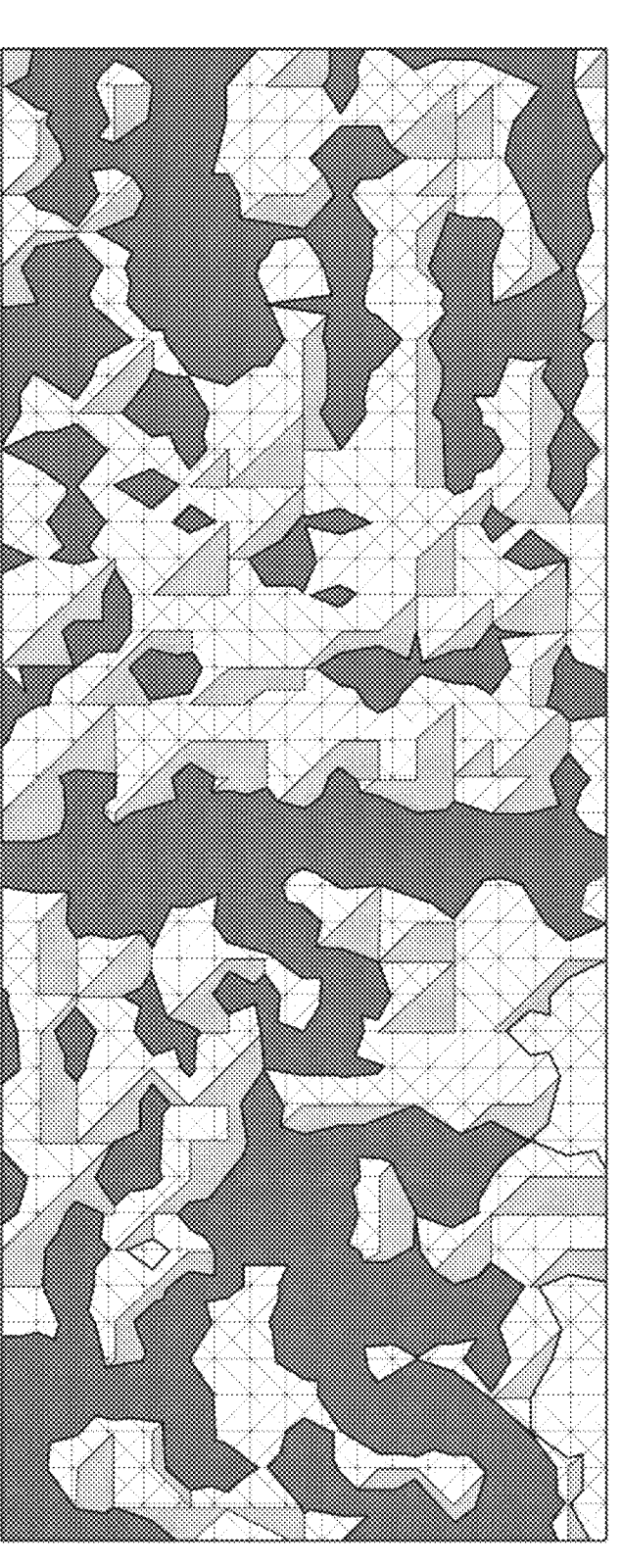

FIG. 11 is a graph illustrating the polarity and intensity of a voltage in an electronic device according to one or more embodiments.

Referring to FIG. 11, an electronic device (e.g., the electronic device 101 in FIG. 1) according to one or more embodiments may control a display module (e.g., the display module 160 in FIG. 1) through an antistatic mode to flatten the polarity and intensity of a voltage. Dark shading on the drawing may indicate a voltage of –20 to 0, light shading may indicate a voltage of 0 to 10, and white color may indicate a voltage of 10 to 20. The electronic device 101 may reduce the risk of static electricity generation by removing a high-value negative or positive charge through a flattening process.

A method for operating the electronic device 101, according to one or more embodiments of the disclosure, may include operations of: detecting a specified trigger; acquiring a sensitivity value of a touchscreen panel 670 included in the display module 160 of the electronic device; determining whether to enter an antistatic mode based on the acquired sensitivity value; when entering the antistatic mode as a result of the determination, determining the polarity or intensity of a voltage, based on the acquired sensitivity value; and controlling the display module based on the determined polarity or intensity of the voltage.

In the antistatic mode, a voltage is applied with an inverted phase. The method may further include an operation of entering the antistatic mode when the acquired sensitivity value exceeds a predetermined threshold.

The acquisition operation includes an operation of acquiring the polarity or intensity of a charge of the touchscreen panel as the sensitivity value, and the controlling operation may include an operation of controlling a touchscreen panel IC 650 included in the display module based on the determined polarity or intensity of the voltage such that the touchscreen panel IC applies the determined polarity or intensity of the voltage to the touchscreen panel.

The touchscreen panel may include a normal circuit, a phase inversion circuit, and a switch circuit, and the controlling operation may further include an operation of controlling, when the determined polarity of the voltage is negative (–) polarity, the switch circuit such that the voltage applied to the touchscreen panel is output through the phase inversion circuit.

The operation of determining of the intensity of the voltage may include operations of: identifying a minimum value and a maximum value among sensitivity values of each Tx line of the touchscreen panel; calculating an average of the difference between absolute values of the minimum value and the maximum value; determining the intensity of a voltage to be applied to the touchscreen panel, based on the average; and determining the polarity of the voltage to be applied to the touchscreen panel, based on the polarity of a maximum value among absolute values of the sensitivity values of each Tx line.

The controlling operation may include an operation of controlling a display panel IC (910) included in the display module such that the display panel IC applies the determined polarity or intensity of the voltage to a display panel (930) included in the display module.

The display panel may include a normal circuit, a phase inversion circuit, and a switch circuit, and the controlling operation may further include an operation of controlling, when the determined polarity of the voltage is negative (–) polarity, the switch circuit such that a voltage applied to the display panel is output through the phase inversion circuit.

The operation of determining the polarity or intensity of the voltage may include an operation of identifying the sensitivity value and polarity of Tx and Rx coordinates of the touchscreen panel, an operation of determining the intensity of a voltage, which is to be applied to each coordinate of the display panel, to converge to zero, and an operation of determining the polarity of the voltage, which is to be applied to each coordinate of the display panel, as polarity opposite to that of the identified sensitivity.

The method may further include an operation of entering the antistatic mode with respect to the entire area of the display module, or entering the antistatic mode with respect to a partial area of the display module when the acquired sensitivity value exceeds the predetermined threshold.

The one or more embodiment of the disclosure in this specification and drawings are only presented as specific examples to illustrate the technical content of the disclosure and aid in understanding the disclosure, and are not intended to limit the scope of the disclosure. Therefore, the scope of the disclosure should be interpreted as including all modified or changed forms derived from the technical idea of the disclosure in addition to the embodiments disclosed herein.

What is claimed is:

1. An electronic device comprising:
   a display module comprising a touchscreen panel a touchscreen panel integrated circuit (IC), a display panel, and a display panel IC;
   memory storing one or more instructions; and
   at least one processor configured to execute the one or more instructions,

27 wherein the at least one processor is operatively connected to the display module and the memory, and wherein the one or more instructions, when executed by the at least one processor, cause the electronic device to:

detect a specified trigger, acquire a sensitivity value of the touchscreen panel, determine whether to enter an antistatic mode based on the acquired sensitivity value, based on determining to enter the antistatic mode, determine a polarity or an intensity of a voltage based on the acquired sensitivity value, and control the display module based on the polarity or the intensity of the voltage.

2. The electronic device of claim 1, wherein, based on being in the antistatic mode, a voltage is applied to the touchscreen panel with an inverted phase, and wherein the one or more instructions, when executed by the at least one processor, cause the electronic device to:

enter the antistatic mode based on the acquired sensitivity value exceeding a predetermined threshold.

3. The electronic device of claim 1, wherein the one or more instructions when executed by the at least one processor, cause the electronic device to:

acquire a polarity or an intensity of a charge on the touchscreen panel as the acquired sensitivity value; and based on the polarity or the intensity of the voltage, controlling the touchscreen panel IC to apply the polarity or the intensity of the voltage to the touchscreen panel.

4. The electronic device of claim 1, wherein the touchscreen panel comprises a normal circuit, a phase inversion circuit, and a switch circuit, and wherein the one or more instructions, when executed by the at least one processor, cause the electronic device to:

based on the determined polarity of the voltage being a negative polarity, control the switch circuit to output a voltage applied to the touchscreen panel through the phase inversion circuit.

5. The electronic device of claim 1, wherein the touchscreen panel comprises a plurality of first electrodes, wherein the one or more instructions, when executed by the at least one processor, cause the electronic device to:

identify a minimum sensitivity value and a maximum sensitivity value of each of the plurality of first electrodes, obtain an average of plurality of difference values, wherein each of the plurality of difference values is a difference between an absolute value of the minimum sensitivity value and an absolute value of the maximum sensitivity value of each of the plurality of first electrodes, and determine, based on the average, an intensity of a voltage to be applied to the touchscreen panel.

6. The electronic device of claim 5, wherein the one or more instructions when executed by the at least one processor, cause the electronic device to determine a polarity of the voltage to be applied to the touchscreen panel, based on a polarity of a highest absolute value of a maximum sensitivity value among the maximum sensitivity values of the plurality of first electrodes.

7. The electronic device of claim 1, wherein the specified trigger comprises at least one of: locking or unlocking a screen of the electronic device, detection of folding or unfolding of the electronic device, content playback that exceeds a predetermined duration; detection of imminent video playback, detection of a function call that turns off the display panel IC when the display module is turned off, or detection of a variation in an amount of light acquired by an illumination sensor of the electronic device.

8. The electronic device of claim 1, wherein the one or more instructions when executed by the at least one processor, cause the electronic device to control the display panel IC to apply the polarity or the intensity of the voltage to the display panel.

9. The electronic device of claim 8, wherein the display panel comprises a normal circuit, a phase inversion circuit, and a switch circuit, and wherein the one or more instructions when executed by the at least one processor, cause the electronic device to, based on the polarity of the voltage being negative, control the switch circuit to output a voltage applied to the display panel through the phase inversion circuit.

10. The electronic device of claim 8, wherein the touchscreen panel comprises a plurality of first electrodes and a plurality of second electrodes, wherein the plurality of first electrodes and the plurality of second electrodes are patterned in a matrix form, wherein each intersection of an electrode of the plurality of first electrodes and an electrode of the plurality of second electrodes defines a coordinate point of the touchscreen panel, and wherein the one or more instructions, when executed by the at least one processor, cause the electronic device to:

identify a sensitivity value and a polarity of coordinate points of the touchscreen panel, determining the intensity of a voltage to be applied to each coordinate point of the display panel, wherein each respective voltage intensity is selected to cause a voltage of the corresponding coordinate point to converge to zero, and determining the polarity of the voltage to be applied to each coordinate point of the display panel to be a polarity opposite to that of the identified sensitivity value.

11. The electronic device of claim 1, wherein the one or more instructions, when executed by the at least one processor, cause the electronic device to enter the antistatic mode based on the acquired sensitivity value exceeding a predetermined threshold.

12. The electronic device of claim 1, wherein the one or more instructions, when executed by the at least one processor, cause the electronic device to enter the antistatic mode with respect to at least part of the display module based on the acquired sensitivity value exceeding a predetermined threshold.

13. A method of operating an electronic device, the method comprising:

detecting a specified trigger;

acquiring a sensitivity value of a touchscreen panel included in a display module of the electronic device;

determining whether to enter an antistatic mode based on the acquired sensitivity value;

based on determining to enter the antistatic mode, determining a polarity or an intensity of a voltage, based on the acquired sensitivity value; and controlling the display module based on the polarity or the intensity of the voltage.

14. The method of claim 13, wherein the touchscreen panel comprises a normal circuit, a phase inversion circuit, and a switch circuit, wherein the method further comprises entering the antistatic mode based on the acquired sensitivity value exceeding a predetermined threshold, wherein, based on being in the antistatic mode, a voltage is applied to the touchscreen panel with an inverted phase, and wherein the controlling the display module further comprises, based on the determined polarity of the voltage being a negative polarity, controlling the switch circuit to output a voltage applied to the touchscreen panel through the phase inversion circuit.

15. The method of claim 13, wherein the touchscreen panel comprises a plurality of first electrodes, and wherein the determining the intensity of the voltage comprises:

identifying a minimum sensitivity value and a maximum sensitivity value of each of the plurality of first electrodes, obtaining an average of plurality of difference values, wherein each of the plurality of difference values is a difference between an absolute value of the minimum sensitivity value and an absolute value of the maximum sensitivity value of each of the plurality of first electrodes, determining, based on the average, an intensity of a voltage to be applied to the touchscreen panel, and determining a polarity of the voltage to be applied to the touchscreen panel, based on a polarity of a highest absolute value of a maximum sensitivity value among the maximum sensitivity values of the plurality of first electrodes.

16. The method of claim 13, wherein the specified trigger comprises at least one of: locking or unlocking a screen of the electronic device, detection of folding or unfolding of the electronic device, content playback that exceeds a predetermined duration, detection of imminent video playback, detection of a function call that turns off the display panel integrated circuit (IC) when the display module is turned off, or detection of a variation in an amount of light acquired by an illumination sensor of the electronic device.

17. The method of claim 13, wherein the controlling the display module further comprises controlling a display panel integrated circuit (IC) included in the display module such that the display panel IC applies the determined polarity or the determined intensity to a display panel included in the display module.

18. The method of claim 17, wherein the display panel IC comprises a normal circuit, a phase inversion circuit, and a switch circuit, and wherein the controlling the display module further comprises controlling, when the determined polarity is negative (−) polarity, the switch circuit such that a voltage applied to the display panel is output through the phase inversion circuit.

19. The method of claim 13, wherein the determining the polarity or the intensity of the voltage comprises:

identifying the sensitivity value and polarity of Tx and Rx coordinates of the touchscreen panel;

determining the intensity of a voltage to be applied to each coordinate of the touchscreen panel, wherein each respective voltage intensity is selected to cause a voltage of the corresponding coordinate point to converge to zero; and determining the polarity of the voltage to be applied to each coordinate point of the touchscreen panel to be a polarity opposite to that of the identified sensitivity.

20. The method of claim 13, further comprising entering the antistatic mode with respect to an entire area of the display module, or entering the antistatic mode with respect to a partial area of the display module based on the acquired sensitivity value exceeding a predetermined threshold.

* * * * *